(12) United States Patent
Zohar et al.

(10) Patent No.: US 12,405,809 B2
(45) Date of Patent: Sep. 2, 2025

(54) GUI ELEMENT ACQUISITION USING A PLURALITY OF ALTERNATIVE REPRESENTATIONS OF THE GUI ELEMENT

(71) Applicant: WalkMe Ltd., Tel Aviv (IL)

(72) Inventors: Ron Zohar, Givatayim (IL); Moran Shemer, Ra'anana (IL); Nir Nahum, Tel Aviv (IL)

(73) Assignee: Walkme LTD., Tel Aviv (IL)

( * ) Notice: Subject to any disclaimer, the term of this patent is extended or adjusted under 35 U.S.C. 154(b) by 356 days.

(21) Appl. No.: 17/513,291

(22) Filed: Oct. 28, 2021

(65) Prior Publication Data

US 2022/0050564 A1 Feb. 17, 2022

Related U.S. Application Data

(63) Continuation of application No. PCT/IL2019/050475, filed on Apr. 30, 2019.

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 3/0484* (2013.01); *G06F 16/953* (2019.01); *G06F 16/972* (2019.01)

(58) Field of Classification Search
CPC ........ G06F 9/451; G06F 16/953; G06F 16/97; G06F 3/0482; G06F 3/0484
See application file for complete search history.

(56) References Cited

U.S. PATENT DOCUMENTS 5,583,983 A   12/1996 Schmitter
5,727,129 A    3/1998 Barrett et al.
(Continued)

FOREIGN PATENT DOCUMENTS

CN   107939617 A   4/2018
CN   207485608 U   6/2018
(Continued)

OTHER PUBLICATIONS

Xie et al, "Guide: A GUI DifferEntiator", in 2009 IEEE International Conference on Software Maintenance (pp. 395-396). IEEE. Retrieved from the Internet: <URL: https://www.cs.uic.edu/~drmark/index_htm_files/GUIDE_ToolDemo.pdf>, Sep. 30, 2009.
(Continued)

*Primary Examiner* — Andrew T Chiusano
(74) *Attorney, Agent, or Firm* — Myers Wolin, LLC

(57) ABSTRACT

A method, apparatus and product for GUI element acquisition using a plurality of alternative representations of the GUI element. The method comprising: obtaining a selection of a Graphical User Interface (GUI) element; obtaining a representation set of the GUI element, wherein the representation set comprises a plurality of alternative representations, each of which provides a manner of identifying the GUI element in GUIs; applying the representation set to identify the GUI element in a GUI of a program, wherein said applying the representation set comprises, for each representation of the alternative representations, independently applying the each representation to identify one or more GUI elements corresponding the each representation; and in response to determining that said applying the representation set provides an indefinite result, obtaining a modified representation set.

29 Claims, 11 Drawing Sheets

(51) Int. Cl.
*G06F 3/0484* (2022.01)
*G06F 16/953* (2019.01)
*G06F 16/958* (2019.01)

(56) References Cited

U.S. PATENT DOCUMENTS

| | | | |
|---|---|---|---|
| 6,407,753 B1 | 6/2002 | Budinsky et al. | |
| 7,032,229 B1* | 4/2006 | Flores | G06F 11/3419 709/224 |
| 8,655,913 B1* | 2/2014 | Shah | G06F 16/8373 707/780 |
| 9,262,396 B1* | 2/2016 | Rodriguez Valadez | G06F 16/957 |
| 9,600,401 B1 | 3/2017 | Haischt et al. | |
| 2005/0273762 A1 | 12/2005 | Lesh | |
| 2006/0101067 A1 | 5/2006 | Killian-Kehr et al. | |
| 2006/0167757 A1 | 7/2006 | Holden et al. | |
| 2007/0043701 A1* | 2/2007 | Klementiev | G06F 9/451 |
| 2008/0301079 A1 | 12/2008 | Proctor et al. | |
| 2009/0112916 A1* | 4/2009 | Stuhec | G06Q 10/10 707/999.102 |
| 2010/0175055 A1 | 7/2010 | Wang et al. | |
| 2011/0161874 A1 | 6/2011 | Doughty et al. | |
| 2011/0239141 A1 | 9/2011 | Wang et al. | |
| 2011/0252040 A1* | 10/2011 | Li | G06F 16/3323 707/E17.014 |
| 2012/0124495 A1 | 5/2012 | Amichai et al. | |
| 2014/0019937 A1* | 1/2014 | Clark | G06F 8/73 717/123 |
| 2014/0280165 A1 | 9/2014 | Jain et al. | |
| 2015/0066801 A1 | 3/2015 | Wallace et al. | |
| 2016/0048537 A1 | 2/2016 | Epstein et al. | |
| 2016/0179847 A1 | 6/2016 | Epstein et al. | |
| 2016/0286286 A1 | 9/2016 | Brinker et al. | |
| 2016/0342576 A1 | 11/2016 | Sullivan et al. | |
| 2017/0031877 A1 | 2/2017 | Myers et al. | |
| 2017/0351717 A1* | 12/2017 | Kabra | G06F 16/1748 |
| 2019/0303269 A1* | 10/2019 | Arieli | G06F 11/3672 |
| 2019/0340114 A1* | 11/2019 | Podoler | G06F 11/3684 |
| 2019/0340255 A1 | 11/2019 | Huyghe et al. | |
| 2020/0249964 A1* | 8/2020 | Fernandes | G06F 11/302 |
| 2020/0310952 A1* | 10/2020 | Shani | G06F 16/252 |
| 2020/0327043 A1* | 10/2020 | Dyavappa | G06F 11/3688 |

FOREIGN PATENT DOCUMENTS

| | | |
|---|---|---|
| EP | 2 105 837 A2 | 9/2009 |
| JP | H07225771 A | 8/1995 |
| JP | 2011170503 A | 9/2011 |
| JP | 2011210233 A | 10/2011 |
| JP | 2014102634 A | 6/2014 |
| WO | 2009066762 A1 | 4/2011 |

OTHER PUBLICATIONS

Ostrand et al., "A Visual Test Development Environment for GUI Systems", in ACM Sigsoft Software Engineering Notes (vol. 23, No. 2, pp. 82-92). ACM. Retrieved from the Internet: <URL: https://www.researchgate.net/profile/Thomas_Ostrand/publication/ 220854440_A_Visual_Test_Development_Environment_for_GUI_ Systems/links/0c960518a78cb13fab000000.pdf>, Mar. 31, 1998.

McMaster et al., "An Extensible Heuristic-Based Framework for GUI Test Case Maintenance", in 2009 International Conference on Software Testing, Verification, and Validation Workshops (pp. 251- 254). IEEE. Retrieved from the Internet: <URL: http://www.cs.umd. edu/users/atif/papers/McMasterMemonTESTBEDS2009.pdf>, Apr. 30, 2009.

Zhang et al., "Automatically Repairing Broken Workflows for Evolving GUI Applications", in Proceedings of the 2013 International Symposium on Software Testing and Analysis (pp. 45-55). ACM. Retrieved from the Internet: https://pdfs.semanticscholar. org/09a4/80523c77e6849740106b4dfa135d527853ee.pdf> Jul. 31, 2013.

International Search Report issued by the Israel Patent Office for corresponding International Patent Application No. PCT/IL2019/ 050475, mailed on Jul. 31, 2019.

Written Opinion of the International Searching Authority issued by the Israel Patent Office for corresponding International Patent Application No. PCT/IL2019/050475, mailed on Jul. 31, 2019.

Non-final Office Action issued by the USPTO for U.S. Appl. No. 16/438,951, dated Aug. 5, 2019.

Final Office Action issued by the USPTO for U.S. Appl. No. 16/438,951, dated Nov. 22, 2019.

Non-Final Office Action issed by the USPTO for U.S. Appl. No. 16/719,182, dated Jul. 22, 2020.

Notice of Allowance issued by the USPTO for U.S. Appl. No. 16/719,182, dated Oct. 23, 2020.

The extended European Search Report with the European search opinion issued by the European Patent Office for European Patent Application No. 19927556.1, dated Dec. 14, 2022.

McMaster et al., "An Extensible Heuristic-Based Framework for GUI Test Case Maintenance", IEEE International Conference on Software Testing, Verification and Validation Workshops, Apr. 1, 2009, pp. 251-254, IEEE Computer Society.

Office Action issued by the Japanese Patent Office for Japanese Patent Application No. 2021-558769, dated Jul. 27, 2023.

Office Action issued by the Japanese Patent Office for Japanese Patent Application No. 2021-558769, mailed on Jan. 31, 2023, with English translation attached.

* cited by examiner

GUI ELEMENT ACQUISITION USING A PLURALITY OF ALTERNATIVE REPRESENTATIONS OF THE GUI ELEMENT

CROSS REFERENCE TO RELATED APPLICATIONS

This application is a continuation under 35 U.S.C. § 120 of International Application PCT/IL2019/050475, filed Apr. 30, 2019, the contents of which are incorporated by reference herein

TECHNICAL FIELD

The present disclosure relates to Graphical User Interfaces (GUIs) in general, and to GUI element acquisition, in particular.

BACKGROUND

An application having a Graphical User Interface (GUI) may take many forms. It may have a web version, running in browsers such as CHROME™, FIREFOX™, or the like. Additionally or alternatively, the application may have a desktop version, running on WINDOWS™, OSX™, or the like. Additionally or alternatively, the application may have a native mobile version, running on iOS™, ANDROID™, or the like. Additionally or alternatively, the application may have a web mobile version, running on mobile browsers. Additionally or alternatively, the application may have been written using a cross platform framework such as XAMARIN™, REACT NATIVE™, or the like.

Due to differences in the underlying platform, each version may be different. For example, even using the same programming language may result in different outcomes, such as the case due to different JavaScript engines for each platform. Additionally or alternatively, due to different screen sizes, capabilities, or the like, the same application may have different GUI on each platform.

Additionally or alternatively, during the life cycle of an application it may change. Features may be added, removed, or change place. Additionally or alternatively, the User eXperience (UX) may change, resulting in a changing GUI over time. Additionally or alternatively, users with different roles or permissions may see different views of the same screen.

BRIEF SUMMARY

One exemplary embodiment of the disclosed subject matter is a method comprising: obtaining a selection of a Graphical User Interface (GUI) element; obtaining a representation set of the GUI element, wherein the representation set comprises a plurality of alternative representations, each of which provides a manner of identifying the GUI element in GUIs; applying the representation set to identify the GUI element in a GUI of a program, wherein said applying the representation set comprises, for each representation of the alternative representations, independently applying the each representation to identify one or more GUI elements corresponding the each representation; and in response to determining that said applying the representation set provides an indefinite result, obtaining a modified representation set.

Optionally, the alternative representations comprise a representation, wherein said applying the representation set provides the indefinite result due to failing to identify any element in the GUI using the representation.

The method of claim 1, wherein the alternative representations comprise a first alternative representation and a second alternative representation; wherein said applying the representation set provides the indefinite result due to identifying a first element using the first representation and identifying a second element using the second representation, wherein the first element and the second element are different.

Optionally, said applying the representation set provides the indefinite result due to identifying two or more elements using an alternative representation.

Optionally, said applying the representation set provides the indefinite result due to an alternative representation of the alternative representations, wherein said obtaining the modified representation set comprises removing the alternative representation from the representation set, whereby applying the modified representation set in the GUI of the program provides a definite result.

Optionally, the indefinite result was caused by a first representation, wherein the first representation is comprised by the plurality of alternative representations, wherein said obtaining the modified representation set comprises removing the first representation from the representation set and adding a new representation to the representation set, wherein the new representation is configured to uniquely identify the GUI element in the GUI of the program, whereby applying the modified representation set on a GUI of the program provides a definite result.

Optionally, the method further comprises: applying the new representation on an original GUI, wherein the representation set was determined based on the original GUI, whereby the new representation is also configured to uniquely identify the GUI element in the original GUI.

Optionally, said applying the representation set is performed on a client device; wherein in response to the client device determining that said applying the representation set provides the indefinite result, communicating information to a server, wherein the server is configured to modify the representation set to determine the modified representation set; and wherein said obtaining the modified representation set comprises obtaining by the client device the modified representation set from the server.

Optionally, a server is configured to define the representation set, wherein the server is configured to transmit the representation set to a plurality of client devices; wherein said applying the representation set is performed on a client device; wherein in response to the client device determining that said applying the representation set provides the indefinite result, communicating information to the server, wherein the server is configured to modify the representation set to determine the modified representation set and to transmit the modified representation set to the plurality of client devices; and wherein said obtaining the modified representation set comprises obtaining by a device the modified representation set from the server, wherein the device is comprised by the plurality of client devices.

Optionally, said applying the representation set is performed a plurality of times, each of which with respect to a different GUI, wherein the different GUIs are retrieved from a historic database, retaining GUIs previously encountered by computerized agents.

Optionally, an alternative representation uses at least one of: one or more attributes of the GUI element; one or more attributes of another GUI element; a relative path to the GUI element in a hierarchy of elements; and an absolute path to the GUI element in the hierarchy of elements.

Optionally, said obtaining the representation set comprises: determining a set of alternative representations; and selecting a subset from the set of alternative representations, whereby selecting the plurality of alternative representations; and wherein the modified representation set is obtained by selecting a different subset from the set of alternative representations.

Optionally, the method further comprises, in response to determining that said applying the representation set provides an indefinite result: displaying the GUI to a user; identifying the GUI element in the GUI based on user input from the user; and wherein said obtaining the modified representation set comprises determining a new set of alternative representations that uniquely identify the GUI element in the GUI, wherein the modified representation set comprises the new set of alternative representations.

Optionally, said displaying the GUI comprises displaying the GUI and marking a suggested element, wherein the user input is a confirmation of the suggested element.

Optionally, said obtaining the representation set comprises applying a predictive model to select the plurality of alternative representations for the representation set from a set of alternative representations; wherein the predictive model is trained based on GUI elements and alternative representations thereof.

Optionally, said obtaining the modified representation set comprises applying a predictive model to select an alternative representation to be removed from the representation set, wherein the predictive model is trained based on data that comprises manual modifications to representation sets.

Optionally, the representation set comprises the plurality of alternative representations and one or more additional alternative representations; wherein the method further comprises: obtaining a current GUI context of the GUI; and wherein said applying the representation set comprises selecting the plurality of alternative representations based on the GUI context and applying only the plurality of alternative representations without applying the one or more additional alternative representations.

Optionally, the GUI element is selected from a group consisting of a checkbox, a click button, a radio button, a dropdown list, a dropdown button, a toggle button, a text field, a date and time picker, a search field, a breadcrumb, a pagination, a tag, a slider, an icon, an image carousel, a notification, a progress bar, a tool tip, a message box, a modal window, a widget, a menu bar, a tab, a table, an image element, a label, and an accordion.

Optionally, the representation set comprises a set of alternative representations, wherein the set of alternative representations comprise the plurality of alternative representations and at least one more alternative representation; and wherein said applying the representation set comprises determining a subset of the set of alternative representations to be applied on the GUI, wherein the subset consists of the plurality of alternative representations, whereby said applying selectively applies only a portion of available alternative representations.

Another exemplary embodiment of the disclosed subject matter is a computer program product comprising a non-transitory computer readable storage medium retaining program instructions, which program instructions when read by a processor, cause the processor to perform: obtaining a selection of a Graphical User Interface (GUI) element; obtaining a representation set of the GUI element, wherein the representation set comprises a plurality of alternative representations, each of which provides a manner of identifying the GUI element in GUIs; applying the representation set to identify the GUI element in a GUI of a program, wherein said applying the representation set comprises, for each representation of the alternative representations, independently applying the each representation to identify one or more GUI elements corresponding the each representation; and in response to determining that said applying the representation set provides an indefinite result, obtaining a modified representation set.

Optionally, the alternative representations comprise a representation, wherein said applying the representation set provides the indefinite result due to failing to identify any element in the GUI using the representation.

Optionally, the alternative representations comprise a first alternative representation and a second alternative representation; wherein said applying the representation set provides the indefinite result due to identifying a first element using the first representation and identifying a second element using the second representation, wherein the first element and the second element are different.

Optionally, said applying the representation set provides the indefinite result due to identifying two or more elements using an alternative representation.

Optionally, said applying the representation set provides the indefinite result due to an alternative representation of the alternative representations, wherein said obtaining the modified representation set comprises removing the alternative representation from the representation set, whereby applying the modified representation set in the GUI of the program provides a definite result.

Optionally, the indefinite result was caused by a first representation, wherein the first representation is comprised by the plurality of alternative representations, wherein said obtaining the modified representation set comprises removing the first representation from the representation set and adding a new representation to the representation set, wherein the new representation is configured to uniquely identify the GUI element in the GUI of the program, whereby applying the modified representation set on a GUI of the program provides a definite result.

Optionally, said program instructions when read by the processor, further cause the processor to perform: applying the new representation on an original GUI, wherein the representation set was determined based on the original GUI, whereby the new representation is also configured to uniquely identify the GUI element in the original GUI.

Optionally, said applying the representation set is performed on a client device; wherein in response to the client device determining that said applying the representation set provides the indefinite result, communicating information to a server, wherein the server is configured to modify the representation set to determine the modified representation set; and wherein said obtaining the modified representation set comprises obtaining by the client device the modified representation set from the server.

Optionally, a server is configured to define the representation set, wherein the server is configured to transmit the representation set to a plurality of client devices; wherein said applying the representation set is performed on a client device; wherein in response to the client device determining that said applying the representation set provides the indefinite result, communicating information to the server, wherein the server is configured to modify the representation set to determine the modified representation set and to transmit the modified representation set to the plurality of client devices; and wherein said obtaining the modified representation set comprises obtaining by a device the modified representation set from the server, wherein the device is comprised by the plurality of client devices.

Optionally, said applying the representation set is performed a plurality of times, each of which with respect to a different GUI, wherein the different GUIs are retrieved from a historic database, retaining GUIs previously encountered by computerized agents.

Optionally, said obtaining the representation set comprises: determining a set of alternative representations; and selecting a subset from the set of alternative representations, whereby selecting the plurality of alternative representations; and wherein the modified representation set is obtained by selecting a different subset from the set of alternative representations.

Optionally, said program instructions when read by the processor, further cause the processor to perform, in response to determining that said applying the representation set provides an indefinite result: displaying the GUI to a user; identifying the GUI element in the GUI based on user input from the user; and wherein said obtaining the modified representation set comprises determining a new set of alternative representations that uniquely identify the GUI element in the GUI, wherein the modified representation set comprises the new set of alternative representations.

Optionally, said displaying the GUI comprises displaying the GUI and marking a suggested element, wherein the user input is a confirmation of the suggested element.

Optionally, said obtaining the representation set comprises applying a predictive model to select the plurality of alternative representations for the representation set from a set of alternative representations; wherein the predictive model is trained based on GUI elements and alternative representations thereof.

Optionally, said obtaining the modified representation set comprises applying a predictive model to select an alternative representation to be removed from the representation set, wherein the predictive model is trained based on data that comprises manual modifications to representation sets.

Optionally, the representation set comprises the plurality of alternative representations and one or more additional alternative representations; wherein said program instructions when read by the processor, further cause the processor to perform: obtaining a current GUI context of the GUI; and wherein said applying the representation set comprises selecting the plurality of alternative representations based on the GUI context and applying only the plurality of alternative representations without applying the one or more additional alternative representations.

Optionally, the representation set comprises a set of alternative representations, wherein the set of alternative representations comprise the plurality of alternative representations and at least one more alternative representation; and wherein said applying the representation set comprises determining a subset of the set of alternative representations to be applied on the GUI, wherein the subset consists of the plurality of alternative representations, whereby said applying selectively applies only a portion of available alternative representations.

Yet another exemplary embodiment of the disclosed subject matter is an apparatus comprising a processor and a coupled memory, the processor being adapted to perform the steps of: obtaining a selection of a Graphical User Interface (GUI) element; obtaining a representation set of the GUI element, wherein the representation set comprises a plurality of alternative representations, each of which provides a manner of identifying the GUI element in GUIs; applying the representation set to identify the GUI element in a GUI of a program, wherein said applying the representation set comprises, for each representation of the alternative representations, independently applying the each representation to identify one or more GUI elements corresponding the each representation; and in response to determining that said applying the representation set provides an indefinite result, obtaining a modified representation set.

Optionally, the alternative representations comprise a representation, wherein said applying the representation set provides the indefinite result due to failing to identify any element in the GUI using the representation.

Optionally, the alternative representations comprise a first alternative representation and a second alternative representation; wherein said applying the representation set provides the indefinite result due to identifying a first element using the first representation and identifying a second element using the second representation, wherein the first element and the second element are different.

Optionally, said applying the representation set provides the indefinite result due to identifying two or more elements using an alternative representation.

Optionally, said applying the representation set provides the indefinite result due to an alternative representation of the alternative representations, wherein said obtaining the modified representation set comprises removing the alternative representation from the representation set, whereby applying the modified representation set in the GUI of the program provides a definite result.

Optionally, the indefinite result was caused by a first representation, wherein the first representation is comprised by the plurality of alternative representations, wherein said obtaining the modified representation set comprises removing the first representation from the representation set and adding a new representation to the representation set, wherein the new representation is configured to uniquely identify the GUI element in the GUI of the program, whereby applying the modified representation set on a GUI of the program provides a definite result.

Optionally, said processor is further configured to perform: applying the new representation on an original GUI, wherein the representation set was determined based on the original GUI, whereby the new representation is also configured to uniquely identify the GUI element in the original GUI.

Optionally, said applying the representation set is performed on a client device;
  wherein in response to the client device determining that said applying the representation set provides the indefinite result, communicating information to a server, wherein the server is configured to modify the representation set to determine the modified representation set; and wherein said obtaining the modified representation set comprises obtaining by the client device the modified representation set from the server.

Optionally, the apparatus is a client device, wherein a server is configured to define the representation set, wherein the server is configured to transmit the representation set to a plurality of client devices; wherein said applying the representation set is performed by said client device; wherein in response to the client device determining that said applying the representation set provides the indefinite result, communicating information to the server, wherein the server is configured to modify the representation set to determine the modified representation set and to transmit the modified representation set to the plurality of client devices; and wherein said obtaining the modified representation set comprises obtaining by a device the modified representation set from the server, wherein the device is comprised by the plurality of client devices.

Optionally, said applying the representation set is performed a plurality of times, each of which with respect to a different GUI, wherein the different GUIs are retrieved from a historic database, retaining GUIs previously encountered by computerized agents.

Optionally, said obtaining the representation set comprises: determining a set of alternative representations; and selecting a subset from the set of alternative representations, whereby selecting the plurality of alternative representations; and wherein the modified representation set is obtained by selecting a different subset from the set of alternative representations.

Optionally, said processor is further configured to perform, in response to determining that said applying the representation set provides an indefinite result: displaying the GUI to a user; identifying the GUI element in the GUI based on user input from the user; and wherein said obtaining the modified representation set comprises determining a new set of alternative representations that uniquely identify the GUI element in the GUI, wherein the modified representation set comprises the new set of alternative representations.

Optionally, said displaying the GUI comprises displaying the GUI and marking a suggested element, wherein the user input is a confirmation of the suggested element.

Optionally, said obtaining the representation set comprises applying a predictive model to select the plurality of alternative representations for the representation set from a set of alternative representations; wherein the predictive model is trained based on GUI elements and alternative representations thereof.

Optionally, said obtaining the modified representation set comprises applying a predictive model to select an alternative representation to be removed from the representation set, wherein the predictive model is trained based on data that comprises manual modifications to representation sets.

Optionally, the representation set comprises the plurality of alternative representations and one or more additional alternative representations; wherein said processor is further configured to perform: obtaining a current GUI context of the GUI; and wherein said applying the representation set comprises selecting the plurality of alternative representations based on the GUI context and applying only the plurality of alternative representations without applying the one or more additional alternative representations.

Optionally, the representation set comprises a set of alternative representations, wherein the set of alternative representations comprise the plurality of alternative representations and at least one more alternative representation; and wherein said applying the representation set comprises determining a subset of the set of alternative representations to be applied on the GUI, wherein the subset consists of the plurality of alternative representations, whereby said applying selectively applies only a portion of available alternative representations.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
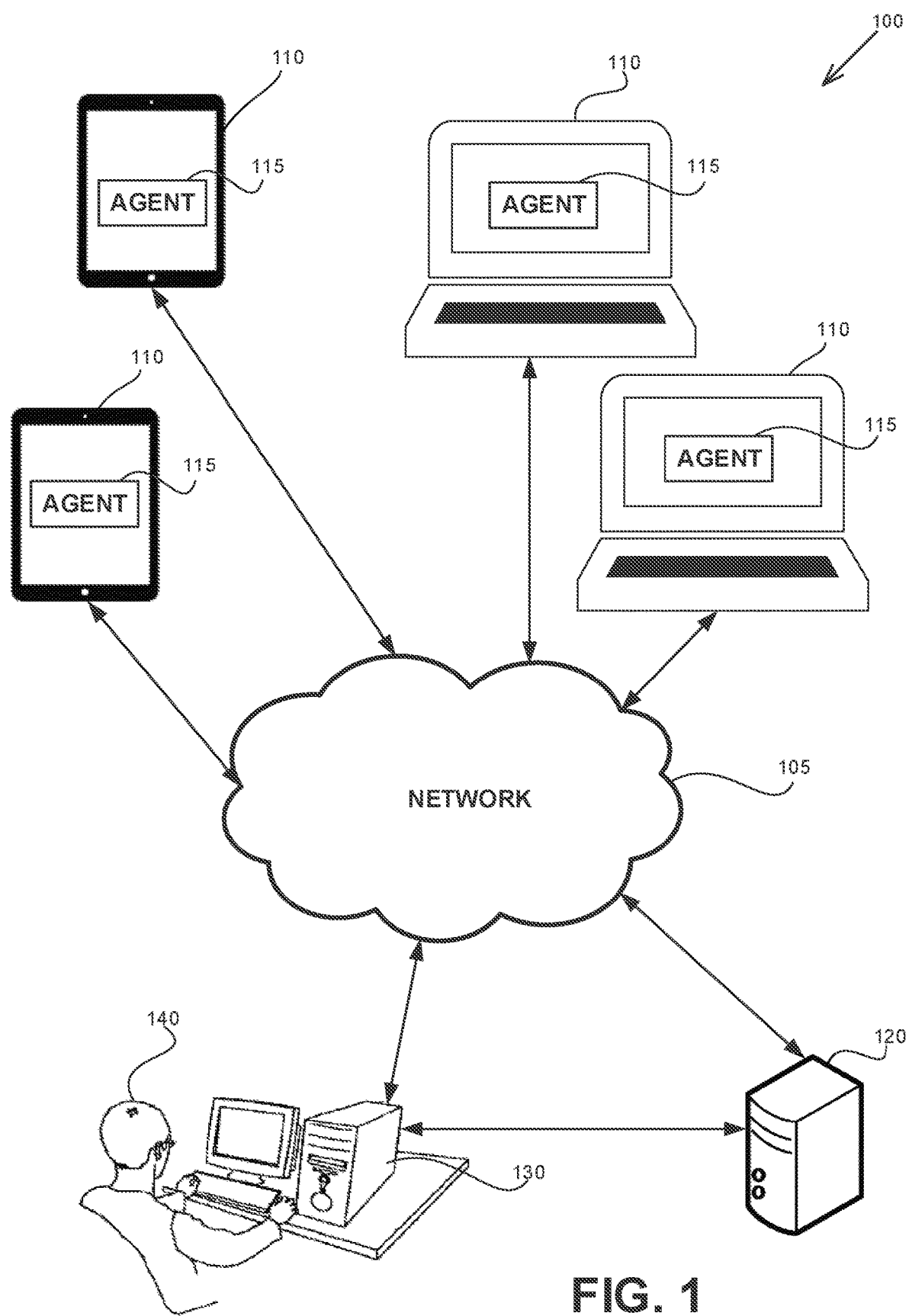
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to represent a GUI element, preferably in a robust manner. In some exemplary embodiments, a GUI element may be a button, a label, a tooltip, a widget, an input field, a text box, or the like. It may be desired to automatically acquire a GUI element in a given GUI in order to allow execution of walkthroughs, gathering information for analytics, process automation, adding a display layer, augmenting functionality of the GUI, or the like.

As an example, a walkthrough may be a tutorial which, when executed, presents, in a sequential manner, descriptive elements relating to the GUI, such as disclosed in U.S. Pat. No. 9,922,008, entitled "Calling Scripts Based Tutorials", which is hereby incorporated by reference in its entirety for all purposes without giving rise to disavowment. The descriptive elements may include instructions and/or examples of usage, and may be associated with respective GUI elements, such as a specific HTML object within a web document. In order to be able to place the descriptive element near the respective GUI element, there is a need to automatically acquire the GUI element. The acquisition of the GUI element may be based on a representation thereof. If, however, there is a change in the GUI, the representation may not be robust, and the acquisition may fail.

In some exemplary embodiments, a GUI element may not have a unique identifier in the GUI that is consistent over time. As an example, a button "OK" may not have any ID associated with it in the source code. There may be multiple buttons with the text "OK". Hence, it may not be feasible to acquire a button by searching for buttons with text "OK".

Additionally or alternatively, there may be different versions of a GUI, such as a web page, each of which may have different text. Hence, the button with text "OK" may be found by searching for the word "OK" in the English version of the web page and may not be found in other versions of the web page such as the German version, the Hebrew version, the Chinese version, or the like.

Additionally or alternatively, the code of the GUI may be dynamically obfuscated. For example, a web page may be obfuscated each time it is retrieved. As an example, a GUI element in a web page may have an "ID" property which is "send button" in the original source code. Each time the web page is retrieved, an obfuscator may choose a new and random ID property. Trying to acquire the GUI element based on the ID "send button" may be plausible during testing but may fail in production. Additionally or alternatively, as an obfuscator may provide a new ID each time the page is retrieved, a successful acquisition may not provide a hint as to an ID that can be used in future acquisitions.

Another technical problem dealt with by the disclosed subject matter is to robustly represent a GUI element in a program that changes over time. A program may change over time as a result of adding new features, removing features, design changes, bug fixes, or the like. It may be desired to find a robust representation. Such robust representation may be needed in order to find the same element over time. As an example, an application may have a "Pay Now" button. The application may change over time. For example, the "Pay Now" button may change place within the application, the size of the button may change, the text may change, or the like. It may be desired to collect usage information automatically regarding how many users have pressed the pay button, how many users have completed the payment, how long did it take for a user to complete the purchase, or the like. Such collected data may be used, for example, in providing useful funnel analysis of the program. Having a representation of the payment button may allow to acquire the payment button in the GUI, and identify interactions therewith. A representation that is not robust over time may fail to allow acquisition of the same button, and therefore may miss interactions with the GUI button (and potentially account interactions with a different GUI element instead). Hence, a representation that is not robust over time may fail to provide a reliable automatic usage analysis. Similarly, a non-robust representation may create a technical challenge for automatic performance of user interactions, such as disclosed, for example, in the subject matter of U.S. Pat. No. 9,934,782, entitled "Automatic performance of user interaction operations on a computing device", which is hereby incorporated by reference in its entirety for all purposes and without giving rise to disavowment.

Yet another technical problem dealt with by the disclosed subject matter is to robustly represent a GUI element in a program that changes over platforms. As an example, a program may have a native version for WINDOWS™ and a hybrid version for mobile devices. It may be desirable to robustly represent a GUI element in a manner that will allow acquisition of the GUI element through the different versions.

One technical solution is to obtain a GUI of a program, such as a screen, a form, a web document, an ANDROID™ layout, an iOS™ playground object, or the like. The GUI of the program may comprise a plurality of GUI elements, including a GUI element of interest. A representation set of the GUI element may be determined and used as a robust representation thereof. The representation set may comprise a plurality of alternative representations. In some exemplary embodiments, the representation set may be applied on the screen, where the GUI element is to be acquired. In some exemplary embodiments, the representation set may be applied by independently applying each of the alternative representations. In some exemplary embodiments, each of the alternative representations may be sufficient to uniquely identify the GUI element. The representation set may be considered as providing a definite result if the results of the alternative representations are in agreement and identify a single element in the screen. Additionally or alternatively, in case the application of the representation set provided an indefinite result, the representation set may be modified. The modified representation set may be a modification that uniquely identifies the GUI element in the screen. Additionally or alternatively, the modified representation set may be useful for acquiring the GUI element in the screen.

In some exemplary embodiments, an alternative representation may use an attribute of the GUI element to identify the GUI element. The attribute may be an identifier of the element, a text associated with the element, the color of the element, or the like. Additionally or alternatively, an alternative representation may use an absolute path to the GUI element in a hierarchy of GUI elements in the screen. In some exemplary embodiments, a GUI element may comprise one or more sub-GUI elements. GUI elements may be represented in a Directed Acyclic Graph (DAG), a tree, or another form of a graph. The GUI may comprise a root element, and a path from the root element to the GUI element may be considered as an absolute path thereto. Additionally or alternatively, an alternative representation may use a relative path from a source GUI element to the target GUI element. A relative path to a GUI element may be the path from a source GUI element to the target GUI element. As an example, in websites there may be a GUI element with the tag 'HTML', which is the root element, from which all other GUI elements are reachable. As an example, referring to Screen 500*a* illustrated in FIG. 5A. Menu 501*a* may be a GUI element which comprises Accounts 502*a*, as well as other elements. A relative path from Menu 501*a* to Accounts 502*a* may be "the $5^{th}$ son of Menu 501*a*". Such representation may allow to acquire the GUI element Accounts 502*a*, based on an acquisition of Menu 501*a*. Additionally or alternatively, an absolute path may in Screen 500*a* to Accounts 502*a*, may be "the $1^{st}$ item that is a menu→the $5^{th}$ menu item", assuming that Menu 501*a* is the first item in Screen 500*a* that is characterized as being a menu. In some exemplary embodiments, the alternative representation may use one or more attributes of one or more other GUI elements to represent the GUI element. For example, an alternative representation may use a query to identify other elements or structures, and select the GUI element therebetween based on a property, such as structural property, attribute of the element, or the like. As an example, an alternative representation may be "find an element which is the deepest root of sub-tree containing elements with attributes <A1> and <A2>". In this example, all sub-trees containing an element with attribute <A1> and an element with attribute <A2> (which may be the same element or a different element), may be identified. Each root of such sub-trees may be examined, and the node that functions as a root of such sub-tree and has a largest distance from the root of the tree representing the GUI may be selected.

In some exemplary embodiments, a Document Object Model (DOM) may provide a tree structure representation for a GUI, such as a GUI based on an HTML, a XHTML, or a XML document. In the logical tree structure of the DOM, each node may be an object representing a part of the document. DOM may be utilized to traverse a desired path in the GUI.

Additionally or alternatively, the representation set may comprise a plurality of alternative representations. Modification of the representation set may comprise removing therefrom one or more alternative representations. Additionally or alternatively, the modified representation set may be determined by selecting a subset of the plurality of alternative representations.

In some exemplary embodiments, the modified representation set may be determined by removing a first alternative representation from the representation set. Additionally or alternatively, the modified representation set may be determined by adding a second alternative representation to the representation set, different than the first alternative representation. In some exemplary embodiments, the second alternative representation may be characterized in that it uniquely identifies the GUI element.

In some exemplary embodiments, applying the modified representation set on the GUI of the program may provide a definite result. Additionally or alternatively, applying the modified representation set may uniquely identify the GUI element.

Another technical solution is to apply the representation set in a client device of an end user. The end user may use a browser running on the client device, an application running on the client device, or the like. In some exemplary embodiments, an agent running on the client device may obtain a representation set. Additionally or alternatively, the agent may apply the representation set on screen currently being watched by the end user. The agent may be utilizing the representation set in order to acquire the GUI element for performing a predetermined process. The agent may determine that applying the representation set provided an indefinite result. In response to determining that applying the representation set provided an indefinite result, the agent may communicate the information to a server. The server may be configured to modify the representation set as to determine the modified representation set. In some exemplary embodiments, the agent may obtain the modified representation set from the server for future uses. In some exemplary embodiments, the server may distribute, in a push or pull manner, the modified representation set to a plurality of agents that may be configured to acquire the GUI element.

In some exemplary embodiments, the server may store the information received from the agents. The information may be used by a machine learning algorithm. The machine learning algorithm may be configured to classify alternative representations in order to match alternative representations with GUI elements.

Another technical solution is to apply the representation set a plurality of times, each of which with respect to a different screen. The different screens may be retrieved from a historic database. The historic database may retain screens previously encountered by computerized agents, such as crawlers, scripts, software products, bots, user-operated clients or the like. In some exemplary embodiments, the agent may be a user-operated client, where the user may instruct the client to save a specific screen encountered by the user in a session. An agent may be executed on a client device and communicate the information to a server. The server may store the information in order to use the information in accordance with the disclosed subject matter.

In some exemplary embodiments, in response to determining that applying the representation set provided an indefinite result, the GUI may be displayed to a user. In some exemplary embodiments, the user may be an administrative user, different than the end user using the device in which the representation set failed to provide a definite result. The user may identify the GUI element in the GUI, select the GUI element in the GUI, mark the GUI element in the GUI, or the like. In some exemplary embodiments, in case that the indefinite result comprises more than one GUI element, the GUI elements identified by the representation set may be displayed to a user. The user may select one GUI element therebetween. Additionally or alternatively, a computerized process may automatically select a top candidate out of the more than one GUI element, and allow the user to verify the automatic selection. The server may store the selection of the user and modify the representation set based thereon.

In some exemplary embodiments, selections of users may be recorded and saved for a future use. As an example, selection of the user may be used as parts of data for a supervised machine learning algorithm.

In some exemplary embodiments, determining the representation set may comprise applying an output of a predictive model. The predictive model may be the output of a machine learning algorithm configured to receive as input alternative representations, screens, GUI elements, GUI contexts, or the like.

One technical effect of utilizing the disclosed subject matter is a robust acquisition of a GUI element. In some exemplary embodiments, the acquisition may be accomplished automatically by an agent. The agent may be configured to perform a useful process using the acquired element, such as displaying and executing a walkthrough, providing an augmented display over the GUI, analyzing the actions of the user or users, executing testing automation, or the like. The robust acquisition may be performed with respect to different versions of the program, different version of the GUI, or the like, without requiring manual intervention or assistance.

Another technical effect of utilizing the disclosed subject matter is to determine a robust representation of a GUI element. The robust representation may comprise a plurality of non-robust representations. In some exemplary embodiment, the disclosed subject matter may be used in order to choose a representation set comprising a subset of alternative representation. A GUI of a program may change over time due to changes in versions, in UX, in functionality of the program, or the like. Utilizing the disclosed subject matter may enable to acquire a GUI element in the GUI, even if the GUI had changed from the GUI that was available when the representation was defined. In some exemplary embodiments, a GUI element may change, a GUI of a program comprising the GUI element may change, or the like. As an example, a GUI element may be acquired by using a text that is associated with the GUI element. The GUI element may be button comprising the text "Like". A new version of the GUI of a program may change the text to another language, to an icon, or the like. The disclosed subject matter may provide a method to acquire the GUI element regardless of such changes.

Yet another technical effect of utilizing the disclosed subject matter is to enable automation processes of programs, such as execution of business processes using the GUI without using dedicated Application Programming Interfaces (APIs), testing automation, or the like. Robust acquisition of GUI elements may enable the automation process to function correctly, and thus reduce resources required for re-execution after manual inspection of error.

Yet another technical effect of utilizing the disclosed subject matter is to enable enhancement of the GUI, such as augmenting functionality thereof, providing adaptable walkthroughs thereto, adding display layer over the GUI, collecting usage statistics, or the like. The GUI enhancement may require automatic acquisition of GUI elements. The disclosed subject matter may provide a robust acquisition, enabling GUI enhancements to function properly over time, in spite of changes to the GUI.

Yet another technical effect of utilizing the disclosed subject matter may be an improvement of resource consumption in the process of utilizing a representation of GUI elements. The disclosed subject matter may provide a robust representation that is durable over time, and avoid the need to redefine a representation with each modification of the GUI, or for each alternative version of the GUI, such as in case of different languages, different platforms, or the like.

Yet another technical effect of utilizing the disclosed subject matter may be to enable automatic modification of a GUI representation, without user intervention. Using machine learning techniques, the disclosed subject matter may define the representation set automatically. Additionally or alternatively, even when the representation set may fail and provide an indefinite result, the disclosed subject matter may provide for an automated manner of correcting the representation set to provide a definite result and acquire the target GUI element correctly.

Yet another technical effect of utilizing the disclosed subject matter is to consume computational resources in the agent, for robustness purposes. Instead of utilizing a single representation to acquire the GUI element, a plurality of alternative and independent representations are used, and therefore consume computational resources. In some exemplary embodiments, the number of alternative representations may be determined as a balance between maximal robustness (e.g., any potential representation) and between best performance (e.g., one representation).

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an environment, in accordance with some exemplary embodiments of the disclosed subject matter.

Environment 100 may comprise a plurality of Client Devices 110. Client Devices 110 may by Personal Computers (PCs), tablets, smartphones, or the like. Client Devices 110 may be connected to a Computerized Network 105, such as a Wide Area Network (WAN), a Local Area Network (LAN), a wireless network, the Internet, an intranet, or the like.

Environment 100 may comprise Server 120, which may be connected to Computerized Network 105. Additionally or alternatively, Administrator Computer 130, operated by Administrator 140 or another user with suitable credentials and permissions, may be connected to Computerized Network 105. In some exemplary embodiments, Server 120 and Administrator Computer 130 may be connected to each other directly, indirectly, such as via Computerized Network 105, or the like. In some exemplary embodiments, Server 120 and Administrator Computer 130 may be implemented by the same physical device.

In some exemplary embodiments, an Agent 115 may be running on a Client Device 110. In some exemplary embodiments, each Client Device 110 may execute a corresponding Agent 115. Additionally or alternatively, only a portion of Client Devices 110 may execute an Agent 115. Agent 115 may be a program product executable by a computer, such as, without limitations, a script, a software, a browser extension, a mobile application, a web application, a Software Development Kit (SDK), a shared library, a Dynamic Link Library (DLL), or the like.

Client Device 110 may be configured to execute a program having a GUI. The program may be, for example, a web page, a web application, a browser extension, a mobile application, desktop application, or the like. The program may display to an end-user one or more screens, constituting the GUI, which comprise GUI elements.

In some exemplary embodiments, Agent 115 may be configured to acquire a GUI element appearing in the GUI. For example, Agent 115 may acquire a specific interactive button, a text element, a tool tip, or the like. GUI element acquisition may be performed in order to for Agent 115 to implement a desired functionality. In some exemplary embodiments, Agent 115 may track user activity with respect to the program, and in particular, monitor usage statistics relating to GUI element. Additionally or alternatively, Agent 115 may implement GUI-based automation, automatically interacting with the GUI on behalf of the end-user, mimicking user-input. Additionally or alternatively, Agent 115 may implement GUI manipulation, such as modifying the GUI, removing existing GUI elements, adding new GUI elements, or the like. Additionally or alternatively, Agent 115 may implement a walkthrough, in which elements of the walkthrough may be displayed in a location adjacent GUI elements, provide call for actions for the end user, relating to GUI elements displayed in the GUI, or the like.

In some exemplary embodiments, Agent 115 may be configured to obtain a representation set of the GUI element. Agent 115 may apply the representation set on the GUI, so as to acquire the GUI element in the GUI. The representation set may comprise a plurality of alternative representations, each of which may provide a manner of identifying the GUI element in the GUI. In order to apply the representation set, Agent 115 may be configured to apply each of the alternative representations in a separate manner.

In some exemplary embodiments, applying the representation set may fail to identify any GUI element in the GUI. Additionally or alternatively, applying the representation set may provide indefinite results due to identifying a first GUI element using a first alternative representation and identifying a second GUI element using a second alternative representation, wherein the first GUI element and the second GUI element are different. Additionally or alternatively, applying the representation set may provide indefinite results due to identifying two or more GUI elements using an alternative representation.

As an example, it may be desired to acquire a "new" button appearing in the GUI and relating to composing a new email, which appears in the email container. In some exemplary embodiments, one representation that may be used to acquire the GUI element, may be to search for an element having the properties "Type=Button" and "Label=new". Another alternative representation may be an element having the properties "Type=Button" and "Parent=Email Container". The representation set may comprise both alternative representations, each of which may be sufficient to identify the GUI element. However, in some exemplary embodiments, the GUI may comprise a plurality of containers, such as email container, contact container, event container, or the like, each of which may comprise a "new" button. As a result, the first alternative representation may provide three different GUI elements when applied on the GUI, as there may be three different elements that match the properties defined thereby. The second alternative representation may still provide a unique result—the GUI element. Such discrepancy may be considered as the representation set providing an indefinite result.

Upon determining that applying the representation set provides an indefinite result, Agent 115 may be configured to communicate the information to Server 120. Server 120 may be configured to obtain such information and provide a modified representation set.

In some exemplary embodiments, applying an alternative representation may not provide a result, may provide an empty result, or the like. It is noted that such alternative representation may be correct. As an example, a feature may be available in one Operating System (OS) and not available in another. A first version of the GUI may have been identical for two different OSs. The feature may be represented using a button. The first version of the GUI may comprise the button in all OSs. A second version of the GUI may be OS specific and may include the button for one OS and not include the button for another OS. Applying the alternative representation on the first version of the GUI may provide the button regardless from which OS the GUI was obtained. Applying the alternative representation on the second version of the GUI may provide the button when the GUI is obtained from a first OS. Additionally or alternatively, applying the alternative representation on the GUI that was obtained from a second OS may not provide a result, as the GUI element is indeed absent from that GUI.

In some exemplary embodiments, Server 120 may retain GUIs. In some exemplary embodiments, Agents 115 may be configured to transmit to Server 120 GUIs encountered thereby. In some exemplary embodiments, each encountered GUI may be transmitted. Additionally or alternatively, only GUIs where the representation set provides an indefinite result may be transmitted. In some exemplary embodiments, a GUI that is retained may be a digital representation of the displayed GUI, such as an Hyper Text Markup Language (HTML) document, a screen capture image, eXtensible Markup Language (XML) document representing the elements of the GUI and their properties, a Document Object Module (DOM) file, ANDROID™ layout, or any other digital representation of the GUI.

In some exemplary embodiments, Server 120 may be configured to define a modified representation set. In some exemplary embodiments, the modified representation set may be defined automatically, manually, or the like. The modified representation set may be defined using a different set of alternative representations. In some exemplary embodiments, the modified representation set may be determined in view of information obtained from one Agent 115 or a plurality of Agents 115. In some exemplary embodiments, the modified representation set may be transmitted by Server 120 to Agents 115. In some exemplary embodiments, Server 120 may broadcast the modified representation set upon its generation. Additionally or alternatively, Server 120 may transmit to each Agent 115 the modified representation set, in response to a query from that agent.

Environment 100 may comprise Administrator Computer 130 and User 140 that may be an operator, a supervisor, an administrator, or the like. In some exemplary embodiments, in response to determining that applying the representation set provides an indefinite result, the information may be communicated to Administrator Computer 130. Administrator Computer 130 may be configured to display the information to Administrator 140. Additionally or alternatively, Administrator Computer 130 may be configured to display to Administrator 140 the GUI, as captured by the agent in which the representation set provided the indefinite result. User 140 may make a selection of the GUI element in the displayed GUI. In response to obtaining from Administrator 140 a selection of the GUI element in the GUI, the modified representation set may be determined. In some exemplary embodiments, the modified representation set may comprise alternative representations, where each of the alternative representations uniquely identify the selected GUI element. In some exemplary embodiments, the alternative representations may be selected from a set of potential alternative representations, such as retained by Server 120 or generated thereby.

Additionally or alternatively, Administrator Computer 130 may be configured to display to Administrator 140, the original GUI, based on which the representation set was determined, with a visual indication of the GUI element, as identified by the representation set. The display may further include the current GUI, in which the representation set provided an indefinite result. In some exemplary embodiments, the display may show the original GUI and the current GUI in a side-by-side manner, enabling Administrator 140 to visually view both GUIs at the same time, compare them, and identify the correlation between the elements thereof. Additionally or alternatively, the display may comprise a visual indication of an estimation of the GUI element. The estimation may be determined, for example, based on a majority of the alternative representations providing a potential candidate. Additionally or alternatively, each alternative representation may be associated with a weight and based on the weights, a score for each candidate may be computed, enabling a selection of atop-scored candidate. Additionally or alternatively, a prediction model may be utilized to determine a predicted selection based on the candidates. In some exemplary embodiments, the display may by centered on the estimated GUI element. Administrator 140 may verify whether the estimation of GUI element is correct, or alternatively indicate it is incorrect. In some exemplary embodiments, in response to an indication of an incorrect estimation, a next-best estimation may be displayed, and so forth. Additionally or alternatively, upon displaying the next estimated candidate, the display may be re-centered on the next estimated candidate. Additionally or alternatively, Administrator 140 may manually select the GUI element in an explicit manner. In some exemplary embodiments, user input may be used by a machine learning algorithm, such as supervised learning, semi-supervised learning, non-supervised learning, or the like, to provide a predictive model capable of replacing a human user by an automated classifier.

In some exemplary embodiments, Agent 115 may be configured to obtain the modified representation set and utilize it as the representation set for acquiring the GUI element. In some exemplary embodiments, Agent 115 may apply the modified representation sets on the current GUI or on additional GUIs.

In some exemplary embodiments, attempts to apply the representation set may be retained and used by a machine learning algorithm, so as to allow improved selection of alternative representations to be used as part of the representation set. The improved selection may take into account properties of the GUI element, the properties of the alternative representation being examined and use a predictive model to estimate robustness of the examined alternative representation over time. Additionally or alternatively, the improved selection may take into account other alternative representations that uniquely identify the GUI element as part of the features used to estimate the robustness of the alternative representation. Additionally or alternatively, the improved selection may take into account other alternative representations that provided indefinite results (of specific type, or in general), alternative representations that were exhibited to be non-robust (e.g., initially provided a unique identification and later on provided a non-unique identification), or the like. Additionally or alternatively, the improved selection may take into account GUI context, properties of the GUI, or the like.

In some exemplary embodiments, a GUI may be associated with a GUI context. The GUI context may be properties relating to the GUI, to the user using the GUI, to the device being used to execute the GUI, to the connectivity status of the device, or the like. As an example, GUI context may comprise an Operating System (OS) of the device being used. As another example, the GUI context may comprise a locale of the device, such as language settings, regional location, time zones, or the like. As yet another example, the GUI context may comprise an identifier of the GUI, such as a Unified Resource Identifier (URI), a screen name, or the like. As yet another example, the GUI context may comprise properties of the logged-in user, such as permissions, settings, roles, or the like. As yet another example, the GUI context may comprise hardware properties of the device, such as screen size, orientation, resolution, network connectivity, or the like. In some exemplary embodiments, a first Agent 115, running on a first Client Device 110, may uniquely identify a GUI element, while a second Agent 115, running on a second Client Device 110, may provide indefinite result for the same GUI, due to a difference in the GUI context.

Figure 2:
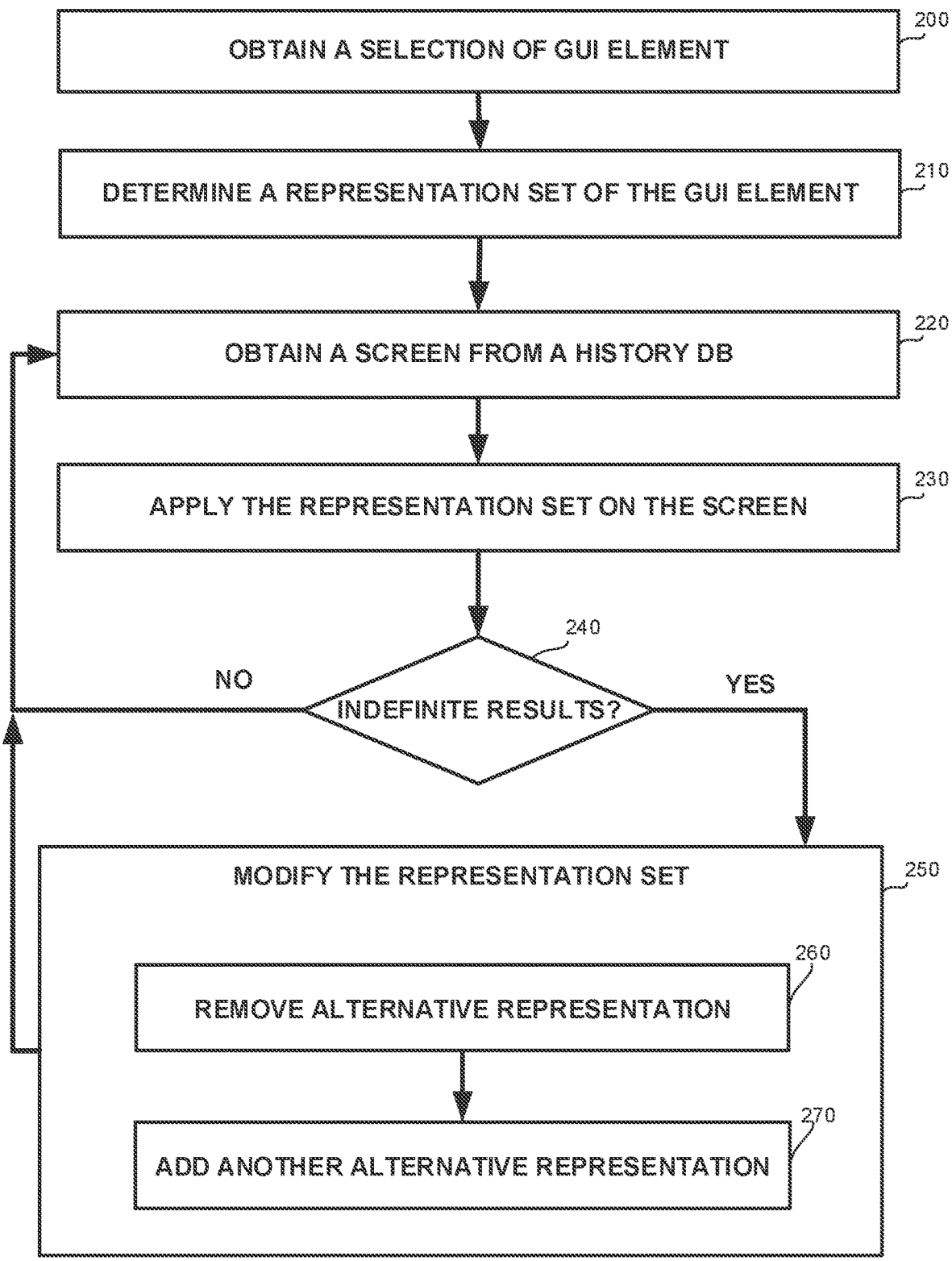
FIGS. 2-4 show flowchart diagrams of methods, in accordance with some exemplary embodiments of the disclosed subject matter.

Referring now to FIG. 2 showing a flowchart diagram of a method, in accordance with some exemplary embodiments of the disclosed subject matter.

On Step 200, a selection of GUI element is obtained. In some exemplary embodiments, a user may select a GUI element from a GUI, also referred to as a screen, to be used as part of an automation process, of a walkthrough, or the like. Additionally or alternatively, the selection may be performed automatically, relating to elements of interest, such as elements for which performance measurements may be tracked. In some exemplary embodiments, the selected GUI element may be a GUI element that may be acquired in the future, such as when the program having the GUI is invoked. In some exemplary embodiments, the selection may be represented in a digital form, such as using a pointer to the selected GUI element in an application, an identifier of the selected GUI element in a web page, or the like. The GUI may part of a program, such as a mobile application, a web application, a desktop software, or the like. Additionally or alternatively, the GUI may be a screen previously presented by a program and retained in a database.

As an example, in some situations, when rendered, the GUI of a program may be Google™ home page. The GUI element may be the search area in which users may type a text. The search area may be obtained by searching for "div id=searchBox". As another example, the GUI may be a screen in a Google™ Search mobile application, instead of a web application. The screen may comprise a GUI element such as a search box, which may be identified as "androidid="searchBox"".

On Step 210, a representation set of the GUI element is determined. The representation set may comprise a plurality of alternative representations, each of which may provide a manner of identifying the GUI element in the GUI of a program.

Referring again to the above example, the search box may have alternative representations that can be used to identify the selected GUI element, such as "div id=searchBox", "GUI element with the text 'Search Google or type a URL'", "the $7^{th}$ div in the page", or the like.

On Step 220, a GUI from a historical database may be obtained. In some exemplary embodiments, the historical database may retain GUIs, such as screens previously encountered by computerized agents, such as web crawlers, Agents 115 of FIG. 1, screens manually saved or archived by users, or the like. In some exemplary embodiments, the GUI obtained from the historical database may be a different version of the GUI from which GUI element was selected. Additionally or alternatively, the historical GUI may comprise the GUI element and as a result, the GUI element may be acquired therein. In some exemplary embodiments, the historical GUI may have the same GUI context as the GUI from which the GUI element was selected or have a shared common property therebetween. As an example, if the GUI element was selected from a webpage having a Unified Resource Locator (URL), historical GUIs of webpages having the same URL may be obtained on Step 220. As another example, the historical GUIs may be screens having the same identifier as the GUI from which the GUI element was selected.

On Step 230, the representation set may be applied on the GUI obtained on Step 220. Applying the representation set may comprise applying each of the alternative representations comprised by the representation set. The results of said applying each of the alternative representations may be retained and compared to one another.

In some exemplary embodiments, some alternative representations may be associated with a GUI context. As an example, the GUI context may comprise a property describing the OS from which the GUI was obtained. The property may be "OS=ANDROID™", "OS=WINDOWS", or the like. Said applying the representation set may comprise selecting a subset of the alternative representations based on the GUI context and applying only the subset, for the purpose of uniquely identifying the GUI element. Referring again to the above example, the homepage of Google™ may be displayed differently for ANDROID™ smartphones. As an example, the search box may be placed in the $8^{th}$ div element and the id may be "searchBox_android". Applying the alternative representation "div id=searchBox" on the updated web page, may not provide any GUI element when the GUI context comprises OS=ANDROID. Additionally or alternatively, the alternative representation "the $7^{th}$ div in the page" may provide a different GUI element than the search box, and should not be used when the GUI context comprises OS=ANDROID. In some cases, for OS=ANDROID, different alternative representations may be available, such as "the $8^{th}$ div in the page", "div id=searchBox_android", or the like. Furthermore, the alternative representation "GUI element with the text 'Search Google or type a URL'" may be applicable to all operating systems and indifferent to the property of OS type in the GUI context. As a result, this alternative representation may be applied for both OS=ANDROID GUI context as well as OS=WINDOWS GUI Context.

On Step 240, it may be determined whether applying the representation set in Step 230 provided an indefinite result. In some exemplary embodiments, the representation set may comprise two different alternative representations: a first and a second alternative representation. Each of the different alternative representation may provide a unique identification of a different GUI element. Additionally or alternatively, an indefinite result may be due to a single alternative representation identifying two different GUI elements, not providing any GUI element, or the like.

In some exemplary embodiments, in case the representation set provided a definite result using the GUI obtained in Step 220, additional versions of the GUI may be obtained and the representation set may be applied thereon on Steps 220-240.

In case that the representation set provided an indefinite result (240), Step 250 may be performed. On Step 250, the representation set may be modified. In some exemplary embodiments, the modification of the representation set may be performed to improve the representation set. Additionally or alternatively, the modification may be aimed at creating a more robust representation that would provide definite results in different versions of the GUI.

On Step 260, an alternative representation may be removed from the representation set. In some exemplary embodiments, a representation set may comprise a plurality of alternative representations. Applying the representation set may provide an indefinite result due a first alternative representation. The first alternative representation may be removed from the representation set. The modified representation set may comprise the alternative representations without the first alternative representation. Re-applying the modified representation set in a GUI of the program may provide a definite result.

Referring again to the example comprising Google™ home page, a representation set comprising the alternative representations "div id=searchBox", "GUI element with the text "Search Google or type a URL"", "the 10th div in the page"; may provide an indefinite result. Removing the alternative representation "the 10th div in the page" may yield a modified representation set. Re-applying the modified representation set in a GUI of the program provides a definite result. The result may be the search box in the web page.

On Step 270, another alternative representation may be added to the modified representation set. The another alternative representation may be a representation that, when applied on the screen of Step 220, would provide a definite result, consistent with the other alternative representations of the modified representation set. In some exemplary embodiments, the another alternative representation may be added in response to determining that the number of alternative representations in the modified representation set is below a minimal threshold number, such as below five, below ten, or the like.

In some exemplary embodiments, an original screen may be stored. The original screen may be a screen comprising the original GUI element. The original screen may be the screen using which the representation set for the GUI element was originally determined. In some exemplary embodiments, the another alternative representation may be added only if the another alternative representation also identifies the GUI element in the original screen. Such restriction may be useful for ensuring that the newly added alternative representation that is added to the representation set, would not lead to an indefinite result, should the modified representation set be applied on the original screen. In some exemplary embodiments, the original screen may be an historic screen, that is no longer relevant. In some cases, the original screen may be replaced by another historic screen, such as after a major release, modifications caused by an operation system update, or the like. The screen that replaces the original screen may be used instead of the original screen to ensure robustness of the another alternative representation.

In some exemplary embodiments, Steps 220-250 may be repeated, using the modified representation set, determined on Step 250. The modified representation set may be applied on other versions of the screen, as retained in the history database. In some exemplary embodiments, screens not yet analyzed in Steps 220-240 may be processed. Additionally or alternatively, screens that were analyzed using the previous representation set, which was modified due to a determination of indefinite results on Step 240, may also be re-processed, such as to ensure that the modified representation set yield definite results with respect to them. In some cases, the screens that are re-processed may be re-processed after processing screens that were not previously processed.

Figure 3:
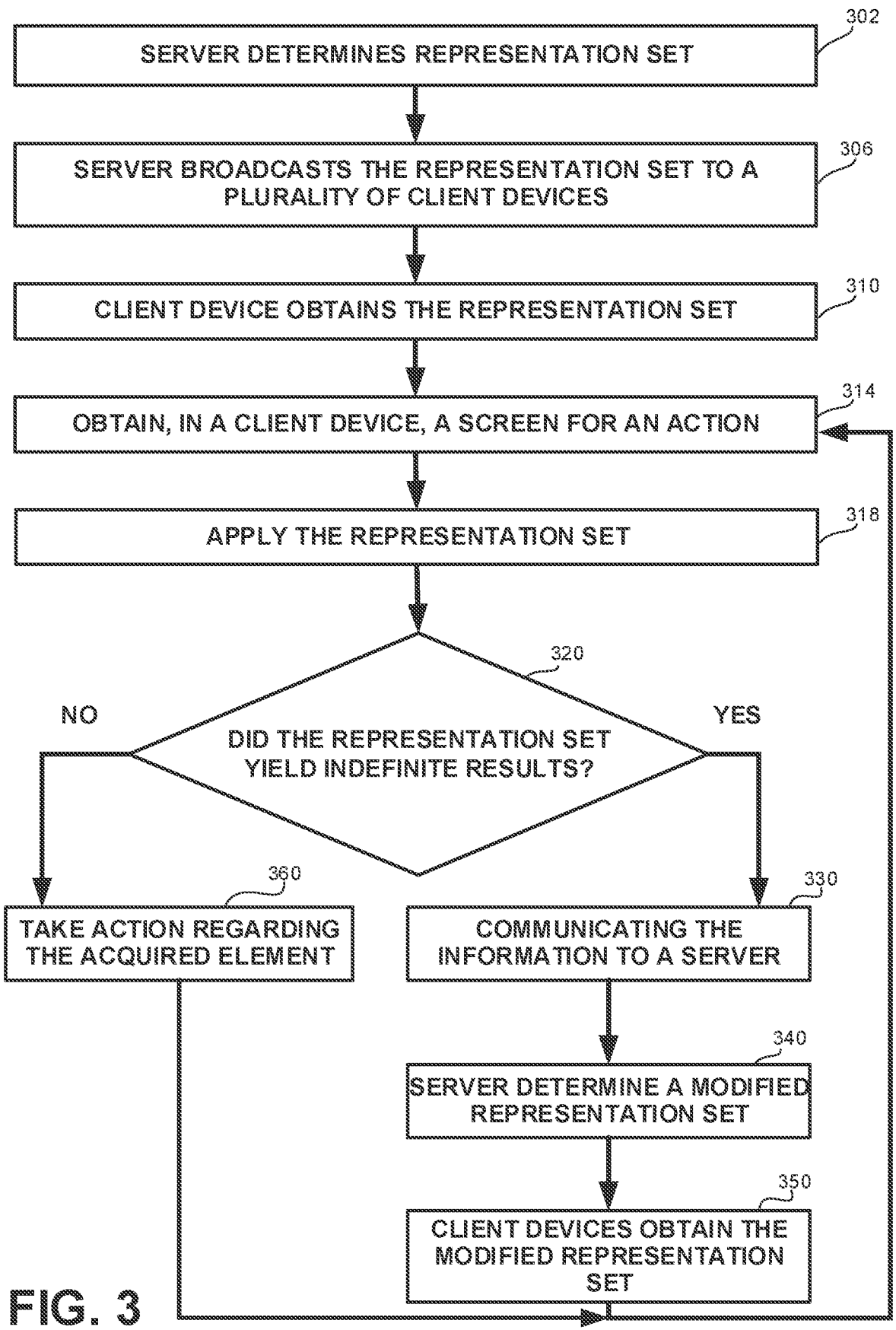

Referring now to FIG. 3 showing a flowchart diagram of a method, in accordance with some exemplary embodiments of the disclosed subject matter.

On Step 302, a server may determine a representation set. The determination may be similar to Step 210 of FIG. 2. In some exemplary embodiments, the server may determine the representation set to be used for acquiring a GUI element, such as selected by a user, for preforming, in the future, an action by a client device.

On Step 306, the server may broadcast the representation set to a plurality of client devices. in some exemplary embodiments, the server may transmit the representation set to each of the client agents, such as Agents 115 of FIG. 1. Additionally or alternatively, the server may store the representation set on a data storage, accessible to the client devices, thereby allowing the client devices to retrieve the representation set, in a pull model.

On Step 310, a client device may obtain the representation set. The representation set may be obtained from the server, and as a result of the server broadcasting the representation on Step 306.

On Step 314, a client device may obtain a screen or another GUI. The screen may be obtained for the purpose of performing an action, such as but not limited to, tracking usage of the screen, presenting a digital walkthrough, performing an automated process, performing automated testing, modifying the visual representation of the screen, presenting another display layer over the screen, augmenting the functionality of the screen, performing analytics, or the like. In some exemplary embodiments, the action may be performed with respect to a GUI element of the screen. In some exemplary embodiments, the screen may be obtained by an agent such as Agent 115 of FIG. 1.

On Step 318, the representation set may be applied on the screen. The application of the representation set may be performed similarly to Step 230 of FIG. 2. In some exemplary embodiments, the representation set may be applied so as to acquire, by the client device, the GUI element, to allow performing the action.

On Step 320, it may be determined whether the application of the representation set yielded an indefinite result. In case that an indefinite result is provided, the representation set had failed to uniquely identify the GUI element and it may be desired to modify the representation set to improve its robustness. Steps 330-350 may be performed. In the other cases, if the GUI element was uniquely identified using the representation set, Step 360 may be performed.

On Step 330, the information may be communicated to the server. The information may comprise the screen, the GUI context, the representation set that was applied, the results of applying the representation set, or the like. In some exemplary embodiments, the information may be provided to the server, so as to improve the representation set. Additionally or alternatively, the server may retain the information to be used by a machine learning algorithm, for quality assurance, or the like.

On Step 340, the server may determine a modified representation set. In some exemplary embodiments, the server may be configured to modify the representation set in order to determine the modified representation set. In some exemplary embodiments, the representation set may be modified in a similar manner to that of Step 250 of FIG. 2. In some exemplary embodiments, the modification may be based on user input, performed automatically using machine learning, using combination thereof, or the like.

On Step 350, client devices may obtain the modified representation set. In some exemplary embodiments, the server may be configured to transmit the modified representation set to the plurality of client devices of Step 306. In some exemplary embodiments, the client devices may be updated with the modified representation set, so as to enable each of the client devices, when obtaining a screen and attempting to acquire the GUI element (e.g., Steps 314-318), to use the modified representation set, instead of the original representation set.

On Step 360, an action may be taken by the client device regarding the GUI element that was acquired. In some exemplary embodiments, an acquired GUI element may be GUI element that is uniquely identified by an application of a representation set. Additionally or alternatively, in case the representation set yielded an indefinite result, an estimated acquired element may be selected and Step 360 may be performed with respect to the estimated acquired element, such as based on a selection criteria, e.g., majority vote, weighted selection, or the like. It is noted that the action may be taken on the client device with respect to an estimated acquired element, which may or may not be the correct GUI element. The action may be taken irrespective to the modified representation set, which may not yet be available at the time the acquisition is performed. For example, the modified representation set may be validated by a human user, who may validate it within a reasonable timeframe, such as, an hour, 24 hours, 72 hours, 2 weeks, or the like. The client device may require an immediate acquisition, on the fly, of the GUI element, for its purposes. Such acquisition may be performed using the estimation, which may be available immediately.

In some exemplary embodiments, Steps 318-360 may be repeated as long as the client agent is running. In some exemplary embodiments, the information collected by the client agent may be communicated to the server. The information may be used in a machine learning algorithm configured to optimize the determination of representation sets over time.

Figure 4:
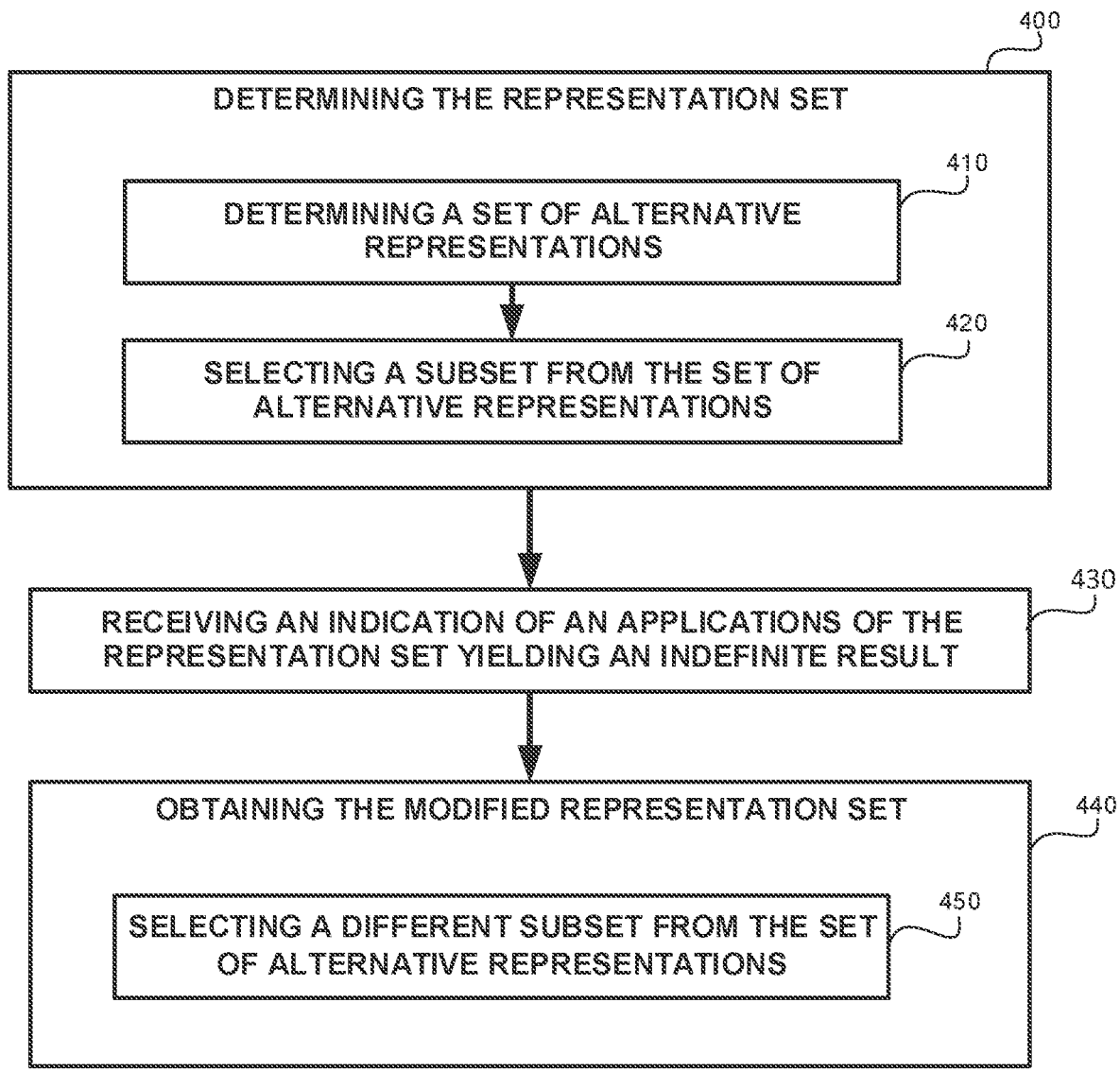

Referring now to FIG. 4 showing a flowchart diagram of a method, in accordance with some exemplary embodiments of the disclosed subject matter.

On Step 400, a representation set may be determined. The determination may be performed by a server, such as Server 120 of FIG. 1. In some exemplary embodiments, the determination may be based on history of previously obtained screens. In some exemplary embodiments, determining a representation set may comprise Step 410 and Step 420.

In some exemplary embodiments, a crawler bot may be configured to crawl over web sites, retrieving the web documents of each web page. The retrieved web documents may be retained in a historic database. Additionally or alternatively, plurality of computerized agents may be deployed in client devices, and obtain each screen viewed by the client, generally or with regard to a specific set of tracked programs. Each such screen may be transmitted to the server and retained in the historic database.

On Step 410, a set of alternative representations may be determined. In some exemplary embodiments, an alternative representation may comprise one or more attributes of a GUI element. Additionally or alternatively, an alternative representation may comprise a relative path to a GUI element in a hierarchy of elements. Additionally or alternatively, an alternative representations may comprise an absolute path to the GUI element in hierarchy of a GUI element. In some exemplary embodiments, all possible combinations of attributes representing the element, paths leading to the elements, attributes representing intermediate elements and paths between the intermediate elements and the GUI element may be determined. In some exemplary embodiments, the number of generated alterative representations may be capped by a maximal number, such as 1,000 representations.

On Step 420, a subset of alternative representations is selected. The subset may be selected from the set of alternative representations that was determined on Step 410. In some exemplary embodiments, the selection may be of a subset with a limited number of alternative representations. In some exemplary embodiments, there may be a maximal number of alternative representations, such as about 5, about 10, about 20. The representation set may include exactly or no more than the maximal number of alternative representations. In some exemplary embodiments, the maximal number of alternative representations may reflect a balance between robustness and performance, in view of each agent needing to apply each alternative representation in production, potentially wasting computational resources. In some exemplary embodiments, the maximal number of alternative representations may provide a limitation on the number of alternative representations applicable per context of the GUI.

In some exemplary embodiments, the selection of the alternative representations to the subset may be based on a selection criteria, such as an estimated robustness score of each alternative representation. Additionally or alternatively, the selection may be performed so as to maximize an estimated robustness score of the representation set, such as in view of different alternative representation accounting for different aspects of the GUI element. For example, some selected representations may be based on the textual attributes of the element, where others may be based on hierarchical properties of the element and yet others may be based on visual attributes of the element. It may be considered unlikely that all different aspects would be modified at the same time, and therefore the representation may continue to be useful for acquiring the GUI element.

On Step 430, an indication may be received. The indication may be indication of an application of the representation set yielding an indefinite result. In some exemplary embodiments, the indication may have been sent by an agent, such as Agent 115 of FIG. 1. The indication may comprise the representation set that was applied, the GUI context, the GUI on which the representation set was applied (e.g., a screen), or the like.

On Step 440, in response to receiving the indication of Step 430, a modified representation set may be determined. The determined representation set may comprise a different subset of the previously generated set of alternative representations, determined in Step 410. On Step 450, the different subset may be selected. The selection may be performed based on the robustness score, in view of which alternative representation has failed to provide a correct result. In some exemplary embodiments, instead of retaining the set of alternative representations of Step 410, the set may be re-computed and a selection may be made therefrom.

Referring now to FIG. 5A-5E, showing illustrations of screens, in accordance with some exemplary embodiments of the disclosed subject matter.

Figure 5A:
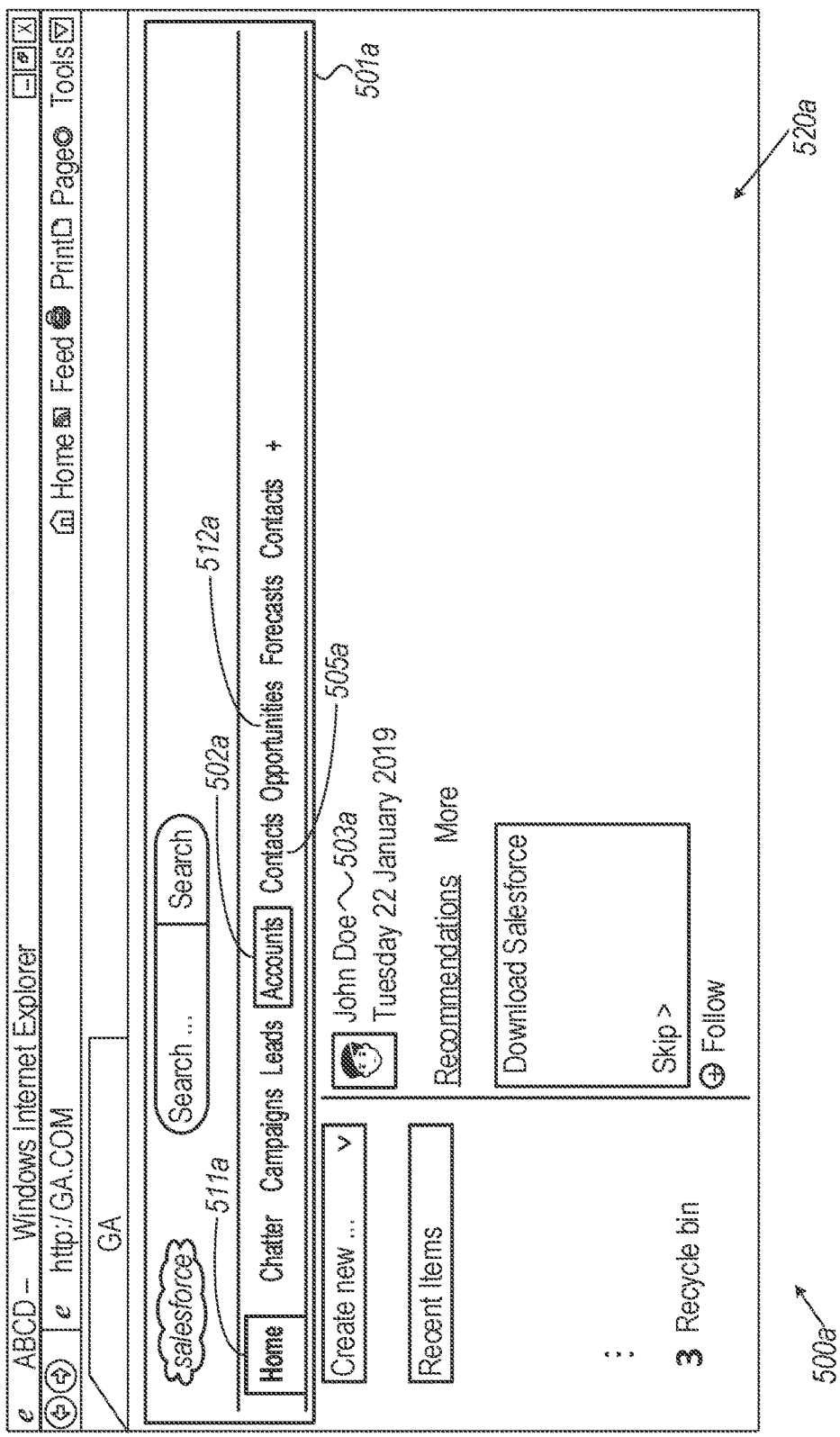
FIGS. 5A-5E shows exemplary screens, in accordance with some exemplary embodiments of the disclosed subject matter.

FIG. 5A may illustrate a web page of a sales portal. The GUI of the web page is shown as Screen 500a. A user by the name of John Doe may be logged in (503a). Screen 500a comprises Menu 501a. Menu 501a comprises categories such as Home 511a, Accounts 502a, Contacts 505a, or the like. Currently, Screen 500a visually indicates that Home 511a is selected and that Pane 520a currently shows the "home" sub-page.

When the menu item Accounts 502a is pressed, a new sub-page, "Accounts" may be loaded to Pane 520a. Additionally or alternatively, the new sub-page may be loaded by loading a different web page, by replacing the content of Pane 520a, or the like.

Menu item Accounts 502a may be acquired by applying a representation set, in accordance with the disclosed subject matter. The representation set may be based on several alternative attributes of Accounts 502a. As an example, the representation set may comprise two alternative representations. The first alternative representation may be being "the $5^{th}$ menu item under the menu". The second alternative representation may be "menu item AND title=Accounts".

Figure 5B:
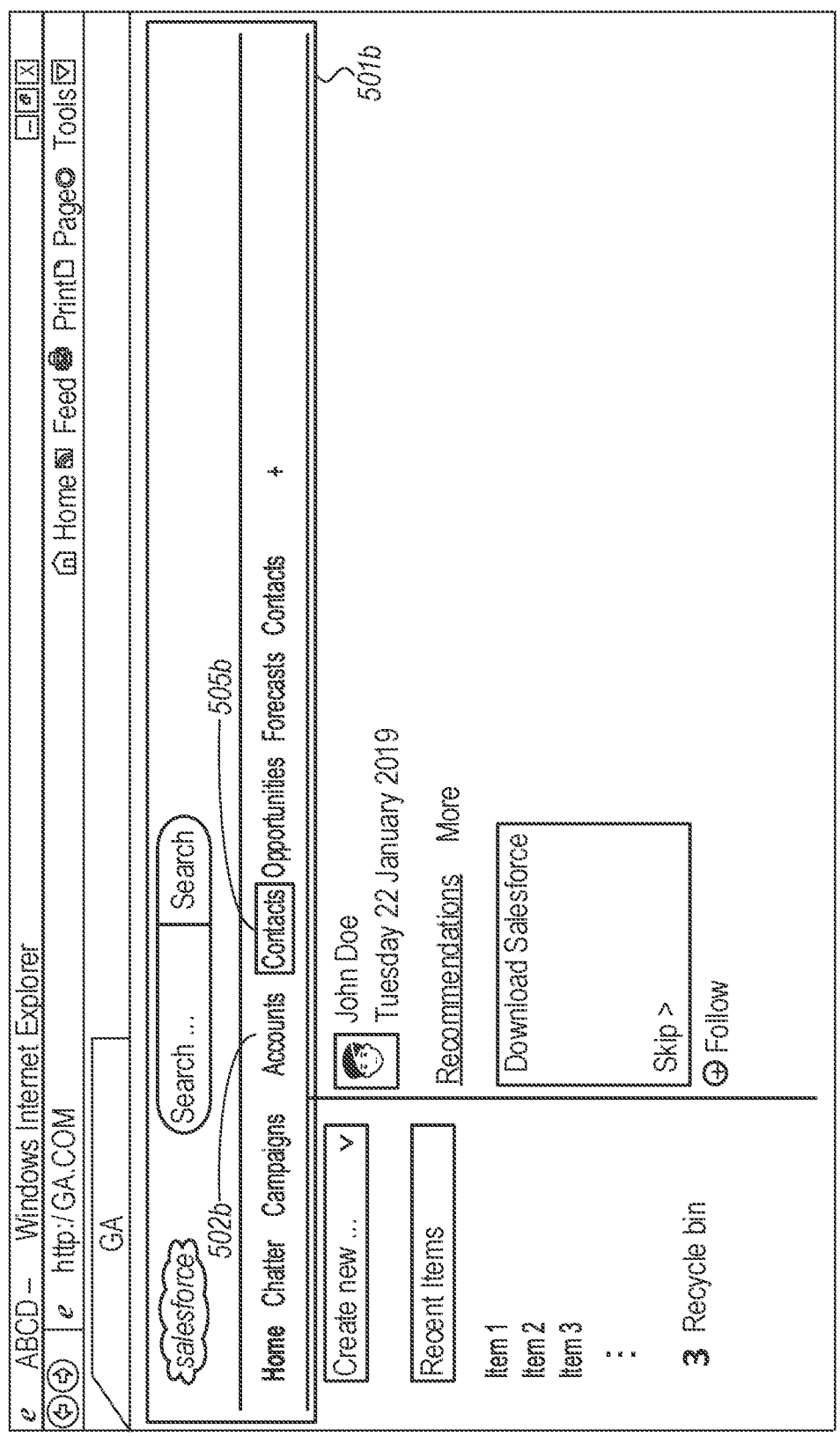

FIG. 5B may illustrate another web page of the same sales portal as FIG. 5A. FIG. 5B shows Screen 500b. However, in this embodiment of the GUI, the $5^{th}$ element in Menu 501b is Contacts 505b, and not Accounts 502b. The difference between the order of menu items between Screens 500a and 500b may be the result of rendering in a different platform, programmatic change of the web page, or the like. In some exemplary embodiments, the difference may be a result of rendering the same source code file using different configurations.

As can be appreciated, if the same representation set described with relation to FIG. 5A would be applied on FIG. 5B, the result would be indefinite. The first alternative representation would point to Contacts 505b, while the second alternative representation would point to the correct target GUI element, Accounts 502b. As can be appreciated, the first alternative representation is not robust and does not guarantee acquisition of the correct element in different embodiments of the same GUI. in some exemplary embodiments, the representation set may comprise additional alternative representations and a majority vote may be used to select the correct element in between the potential elements for acquisition, 502b and 505b.

In some exemplary embodiments, in case the representation set provided an indefinite result when applied on Screen 500b, an administrator may be shown Screen 500a, with a highlighting of the target GUI element, Accounts 502a, side-by-side with Screen 500b, with a highlighting of the potentially acquired elements. In some exemplary embodiments, a most likely correct element out of a plurality of potentially identified elements may be shown to the user for selection. For example, if the representation set identified both elements 502b and 505b as potential element for acquisition based on the alternative representations, one of such elements may be highlighted, and the user may confirm or reject the selection. Such a representation may provide with the user a simple graphical manner to visually determine whether the acquired element in Screen 500b is indeed the element whose acquisition was defined based on Screen 500a. Additionally or alternatively, in case no potential candidate for acquisition is identified, the user may select the element for acquisition from Screen 500b, while viewing the element as shown in Screen 500a.

In some exemplary embodiments, alternative representations may be associated with different GUI contexts, and applied only to screens matching their respective GUI contexts. In some exemplary embodiments, a GUI context may comprise the configuration file. The configuration file may indicate whether the screen being displayed is Screen 500a or Screen 500b. In such a case, it may be determined that an alternative representation that is based on the $5^{th}$ position in the menu ("the $5^{th}$ menu item under the menu") can be used in the configuration indicating Screen 500a, whereas a different alternative representation, such as "the $4^{th}$ menu item under the menu", may be applicable to the configuration indicating Screen 500b.

In some exemplary embodiments, the GUI context may be determined automatically by a context resolution algorithm. The context resolution algorithm may collect information from the device on which the GUI is displayed such as the hardware of the device, the OS of the device, or the like. Additionally or alternatively, the context resolution algorithm may obtain data from files that are associated with the program displaying the GUI such as cookies files, configuration files, or the like. Additionally or alternatively, the context resolution algorithm may obtain data from a back end server configured to serve the program displaying the GUI.

Figure 5C:
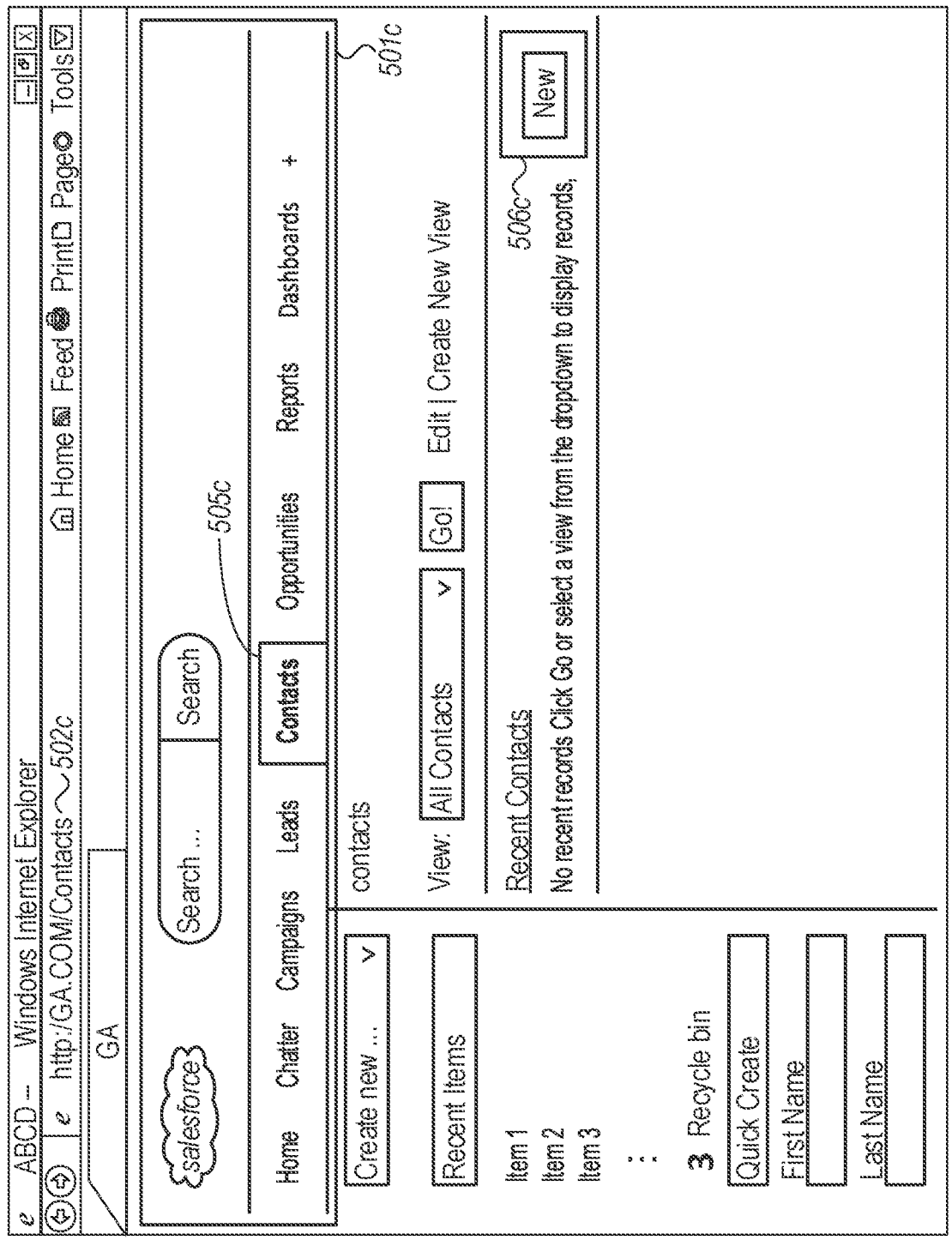

FIG. 5C may illustrate a Screen 500c, showing a "contacts" web page, where Contacts 505c is selected. Screen 500c is a screen of a web browser, comprising also a URL Field 502c, indicating the URL being "ga.com/contacts". In some exemplary embodiments, Screen 500c may be loaded after a user pressed Contacts 505a in Screen 500a of FIG. 5A. Screen 500c comprises New Button 506c. New Button 506c has the label "New". Pressing New Button 506c may, for example, create a new contact.

Figure 5D:
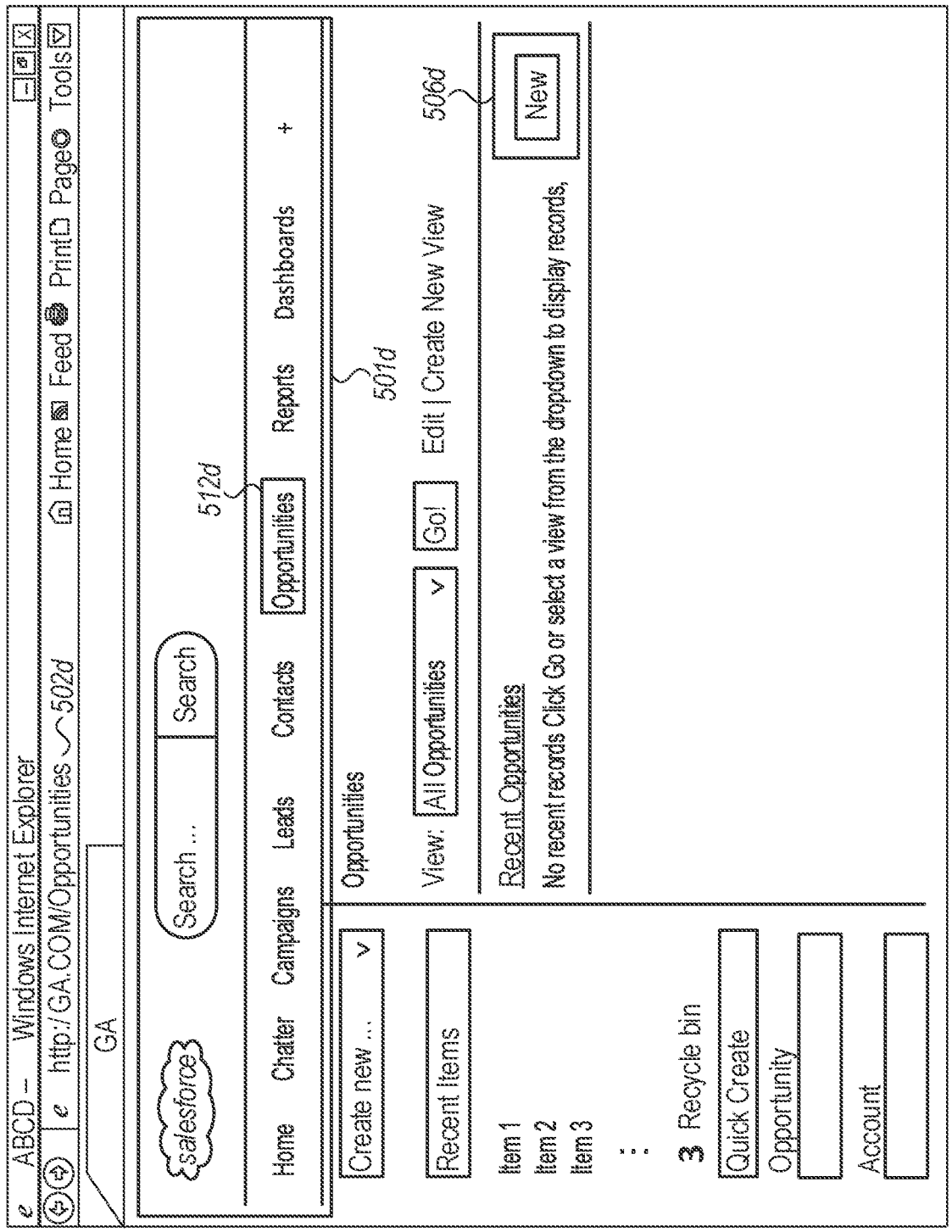

FIG. 5D may illustrate a Screen 500d, showing an "opportunity" web page, where Opportunities 512d is selected. Screen 500d comprises URL Field 502d, indicating the URL being "ga.com/opportunities". The web page may be loaded after a user pressing Opportunity 512a of FIG. 5A. Screen 500d also comprises New Button 506d. Similarly to New Button 506c, New Button 506d is also labeled simply as "New". However, their functionality is different, as clicking on New Button 506d may create a new opportunity rather than a new contact.

A representation set may comprise an alternative representation such as "Type=Button" and "Text=New". Applying that alternative representation on Screen 500c may identify New Button 506c, while applying that alternative representation on a Screen 500d may identify New Button 506d. In spite of the label "New" for a button being a unique identifier in each such screen, such representation is not a robust representation of the relevant button having the desired functionality within the program itself. Hence, the same representation might be utilized as part of the representation set for representing the new contacts button, but would result in an indefinite result when applied on Screen 500d.

In some exemplary embodiments, the alternative representation "Type=Button and Text=New" may be applicable only in the GUI context of the URL being "ga.com/contacts", having a suffix of "/contacts", or the like. In that case, applying the representation set on Screen 500c may identify New Button 506c. Applying that representation set on Screen 500d may provide an empty result, in view of the alternative representation not being applied due to the different GUI context.

Figure 5E:
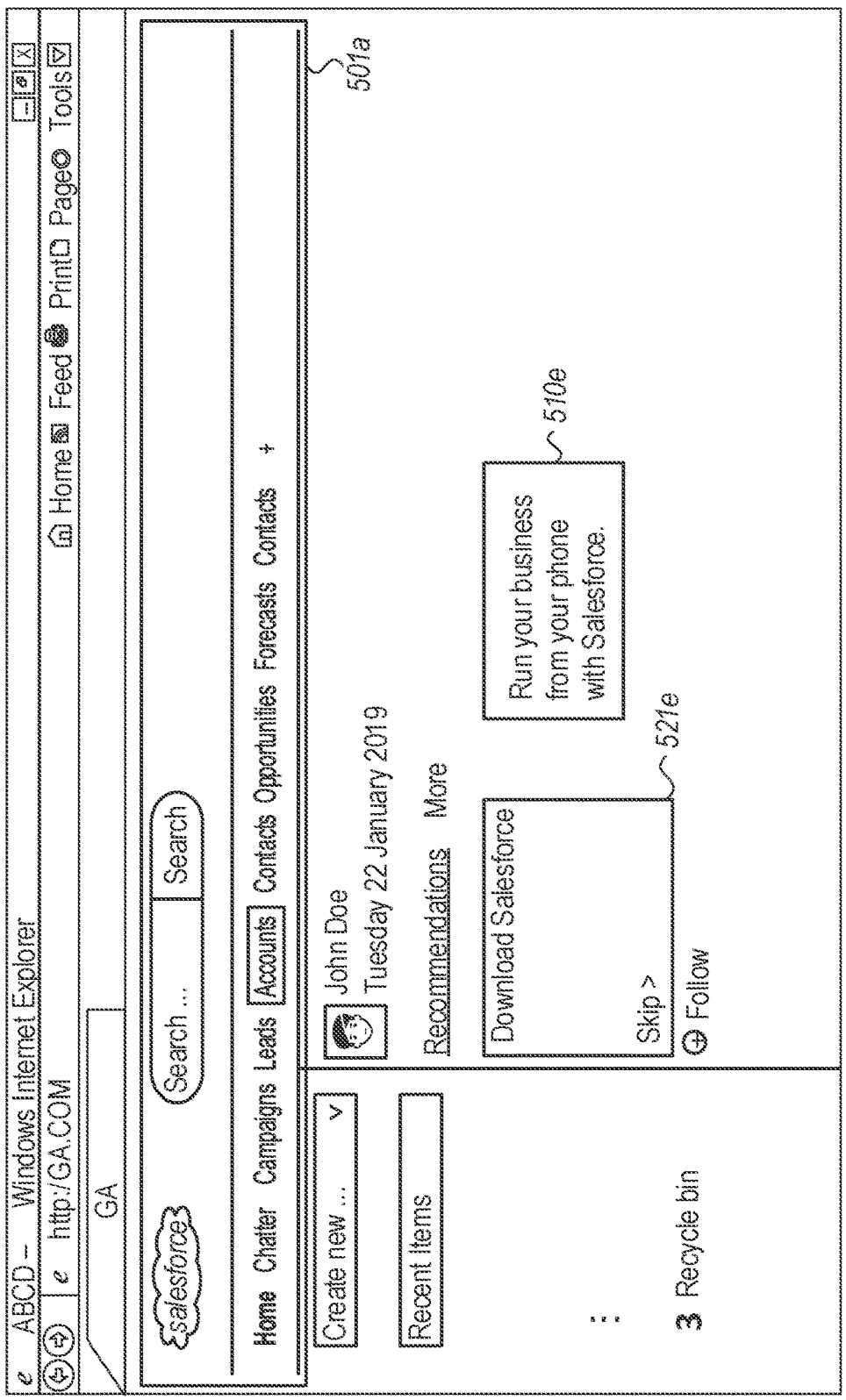

FIG. 5E illustrates Screen 500e similar to that shown in FIG. 5A. Augmented functionality to Screen 500a may provide an additional element not present in the original GUI (Screen 500a). Additionally or alternatively, a display layer may add elements to the GUI. As an example, a tooltip element may be introduced into Screen 500a and presented in 500e. Container 521e may be acquired and modified to introduce a Tooltip Element 510e, which is displayed when a "mouse hover" event is identified with respect to Container 521e. A robust and automatic acquisition of Container 521e may therefore be desired.

Figure 6A:
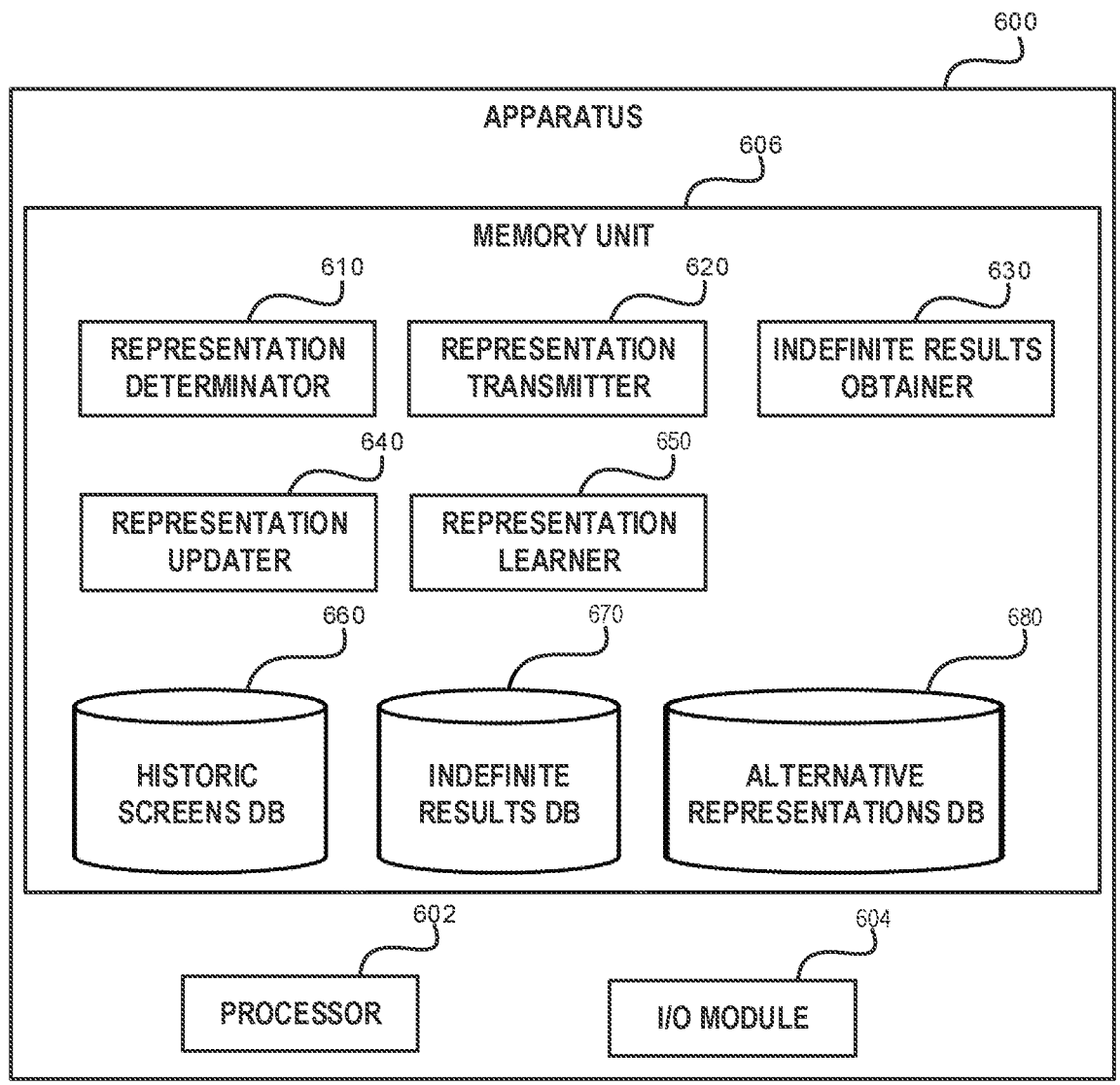
FIG. 6A shows a block diagram of an apparatus, in accordance with some exemplary embodiments of the disclosed subject matter.

Referring now to FIG. 6A, showing an apparatus in accordance with some exemplary embodiments of the disclosed subject matter.

In some exemplary embodiments, Apparatus 600 may be configured to provide backend services to client devices. Additionally or alternatively, Apparatus 600 may be configured to determining representation sets of one or more GUI elements. Additionally or alternatively, Apparatus 600 may be able to transmit, broadcast, or the like a representation set to a client device, to a plurality of client devices, or the like.

In some exemplary embodiments, Apparatus 600 may comprise one or more Processor(s) 602. Processor 602 may be a Central Processing Unit (CPU), a Graphical Processing Unit (GPU), a microprocessor, an electronic circuit, an Integrated Circuit (IC) or the like. Processor 602 may be utilized to perform computations required by Apparatus 600 or any of it subcomponents.

In some exemplary embodiments of the disclosed subject matter, Apparatus 600 may comprise an Input/Output (I/O) Module 604. I/O Module 604 may be utilized to provide an output to and receive input from a user, such as, for example obtaining selection of GUI elements, obtaining a confirmation regarding applying a representation set, or the like. As an example, applying a representation set may provide an indefinite result. A user may observe two or more different results and may provide a selection of a GUI element.

In some exemplary embodiments, Apparatus 600 may comprise Memory Unit 606. Memory Unit 606 may be a hard disk drive, a Flash disk, a Random Access Memory (RAM), a memory chip, or the like. In some exemplary embodiments, Memory Unit 606 may retain program code operative to cause Processor 602 to perform acts associated with any of the subcomponents of Apparatus 600. In some exemplary embodiments, Memory Unit 606 may retain representation sets to be distributed to agents, alternative representations for each element, historic database of screens (e.g., retained in Historic Screens Database 660), or the like.

Memory Unit 606 may comprise one or more components as detailed below, implemented as executables, libraries, static libraries, functions, or any other executable components.

Memory Unit 606 may comprise a Representation Determinator 610. Representation Determinator 610 may be configured to determine a representation set for a GUI element in a GUI of a program. In some exemplary embodiments, Representation Determinator 610 may be configured to generate a set of alternative representations of the GUI element to be used in a representation set. In some exemplary embodiments, Representation Determinator 610 may generate a set of alterative representations, a subset of which may be selected and used in the representation set. In some exemplary embodiments, Representation Determinator 610 may obtain screens from Historic Screens Database 660 to apply the set of alternative representations thereon. Representation Determinator 610 may apply each of the alternative representations comprising the subset in order to build a representation set. By applying the alternative representations on different screens that were encountered in the past, it may be estimated which of the alternative representations is robust and would return the correct result over time. Using such information, the representation set may be built, by including alternative representations that have proved, using screens from Historic Screens Database 660, to provide correct and definite results.

Representation Determinator 610 may be configured to store the set of alternative representations that provided correct results. In some exemplary embodiments, the alternative representations for each GUI element may be retained in Alternative Representations Database 680. Additionally or alternatively, the alternative representations may be retained together with accuracy metrics, indications of screens in which the representation did not function properly, such as GUI context thereof, indications of screens in which the presentation did function properly, or the like.

In some exemplary embodiments, the Representation Determinator 610 may be configured to determine the representation set to be obtained by client agents, enabling such agents to acquire the GUI element.

In some exemplary embodiments, a maximum number of allowed alternative representations per representation set may be provided to Representation Determinator 610. As the number of potential alternative representations may be very large, such as millions or even billions of potential combinations, providing a supremum to the number of alternative representations in the representation set may yield an improvement in the resource consumption of the disclosed subject matter. Additionally or alternatively, a minimum number of alternative representations in the representation set may be provided to Representation Determinator 610. Providing an infimum to the number of alternative representations may ensure a confidence level to the acquisition of a GUI element. As an example, Representation Determinator 610 may generate a representation set comprising five (5) alternative representations. The representation set may provide mixed results when functioning in the field. For example, in some cases, acquisition of the GUI element using the five alternative representations may fail, and in other cases, it may succeed. As a result, the infimum may be increased. For example, instead of using five (5) alternative representations, ten (10) alternative representations may be used, yielding a higher confidence level of acquisition compared to a representation set comprising only half as many alternative representations. In some exemplary embodiments, a potentially optimal number of alternative representations to be used to represent a GUI element may be automatically learned based on the attributes of the GUI element, in view of the actual outcomes of applying representation sets of similar GUI elements. The potentially optimal number may balance performance issues related to applying many alternative representations, on one hand, and confidence level related to applying few alternative representations.

In some exemplary embodiments, Representation Determinator 610 may be configured to determine different representation sets for the same GUI element in different GUI contexts. The GUI context may be indicative for the platform from which the screen was obtained, indicative to characterizations of the user, or the like. As an example, a GUI context may comprise the language in which a web site is presented to the end user. There may be a button comprising a label "END" for the English version and a label "FIN" for the French version. Representation Determinator 610 may determine two different representation sets, one for each language. In some exemplary embodiments, all representation sets may be distributed to all agents to be selected thereby on-the-fly. Additionally or alternatively, each agent may provide a set of relevant GUI contexts thereto, and obtain the representation sets that match the relevant GUI contexts.

Additionally or alternatively, Representation Determinator 610 may store the set of alternative representations to be used by Representation Learner 650. In some exemplary embodiments, Representation Determinator 610 may store the alternative representations that provided a correct result. Additionally or alternatively, Representation Determinator 610 may store the alternative representations that failed to provide the correct result. Such information may be useful for automated learning performed by Representation Learner 650.

Memory Unit 606 may comprise Representation Transmitter 620. Representation Transmitter 620 may be configured to transmit a representation set to a client device, such as Apparatus 601 of FIG. 6B, 110 of FIG. 1, or the like. In some exemplary embodiments, Representation Transmitter 620 may be configured to broadcast a representation set to a plurality of client devices. Additionally or alternatively, the transmission may be invoked by a request from the client device. In some exemplary embodiments, the transmitted representation set, whether broadcasted, or specifically addressed to the client device, may be received thereby and processed by the agent executed thereon.

Memory Unit 606 may comprise Indefinite Results Obtainer 630. Indefinite Results Obtainer 630 may be configured to obtain indefinite results from client devices. In some exemplary embodiments, a client device may apply a representation set, such as in production, that yields an indefinite result. The indefinite result may be reported to Apparatus 600 and obtained by Indefinite Results Obtainer 630. In some exemplary embodiments, Indefinite Results Obtainer 630 may invoke the Representation Updater 640 to modify the representation set in view of the indefinite result. In some exemplary embodiments, the updating is performed immediately after receiving the indefinite result. Additionally or alternatively, the updating may be performed after manual input is provided. Additionally or alternatively, the updating may be performed periodically.

In some exemplary embodiments, the indefinite result obtained by Indefinite Results Obtainer 630 may be stored in Indefinite Results Database 670. In some exemplary embodiments, Alternative Representations Database 680 may be updated to indicate which alternative representation caused the indefinite result, in which GUI contexts, in which GUI, or the like.

Memory Unit 606 may comprise Representation Updater 640. Representation Updater 640 may be configured to update the representation set which provided an indefinite result. Representation Updater 640 may be responsive to an instruction by Indefinite Results Obtainer 630. In some exemplary embodiments, in response to every indefinite result that is obtained, Representation Updater 640 may be configured to modify the representation set by removing therefrom one or more alternative representations. Additionally or alternatively, Representation Updater 640 may be configured to add new alternative representations to the representation set. In some exemplary embodiments, the new alternative representations may be selected from a set of alternative representations generated by Representation Determinator 610, or from a similar set generated on demand by Representation Updater 640.

In some exemplary embodiments, the indefinite result may include two or more different candidate elements for acquisition. Representation Updater 640 may display the candidate elements, or portion thereof, to an administrator user, offering the administrator to select the correct element for acquisition. In some exemplary embodiments, the display may show to the administrator user the original screen and the acquired GUI element thereon, as well as the current screen which resulted in the indefinite result. In some exemplary embodiments, the candidate elements may be highlighted in the current screen. In some exemplary embodiments, candidates having a likelihood score of being correct above a predetermined threshold may be highlighted. Additionally or alternatively, a top candidate may be highlighted. Based on the administrator user selection, Representation Updater 640 may determine which alternative representations misperformed. Additionally or alternatively, the user's selection may be retained in databases, such as 660-680, and utilized for training a machine learning model to automatically select between alternative representations when indefinite results are determined, such as based on attributes of the GUI element, GUI contexts, parameters of the candidate alternative representations, or the like.

Memory Unit 606 may comprise Representation Learner 650. Representation Learner 650 may be configured to train a predictive model based on alternative representations, based on representation sets, based on GUI elements, based on GUIs of programs, or the like. In some exemplary embodiments, the output of Representation Learner 650 may be applied on a currently obtained selection of a GUI element and on alternative representations in order to select the alternative representations to be included in the representation set for the GUI element.

In some exemplary embodiments, Representation Learner 650 may implement a "bag of words" model. Each of the alternative representation may be viewed as a word. Representation Learner 650 may be configured to train a predictive model in which the alternative representations are the features. For each GUI element, the output of Representation Learner 650 may be a representation set comprising a plurality of alternative representations, each of which may be associated with a score, allowing a weighted majority decision. In some exemplary embodiments, in case that applying the representation set provided an indefinite result, a majority decision may provide the GUI element. Additionally or alternatively, the weights may be used to select a subset of the plurality of alternative representations to be used as the representation set.

Figure 6B:
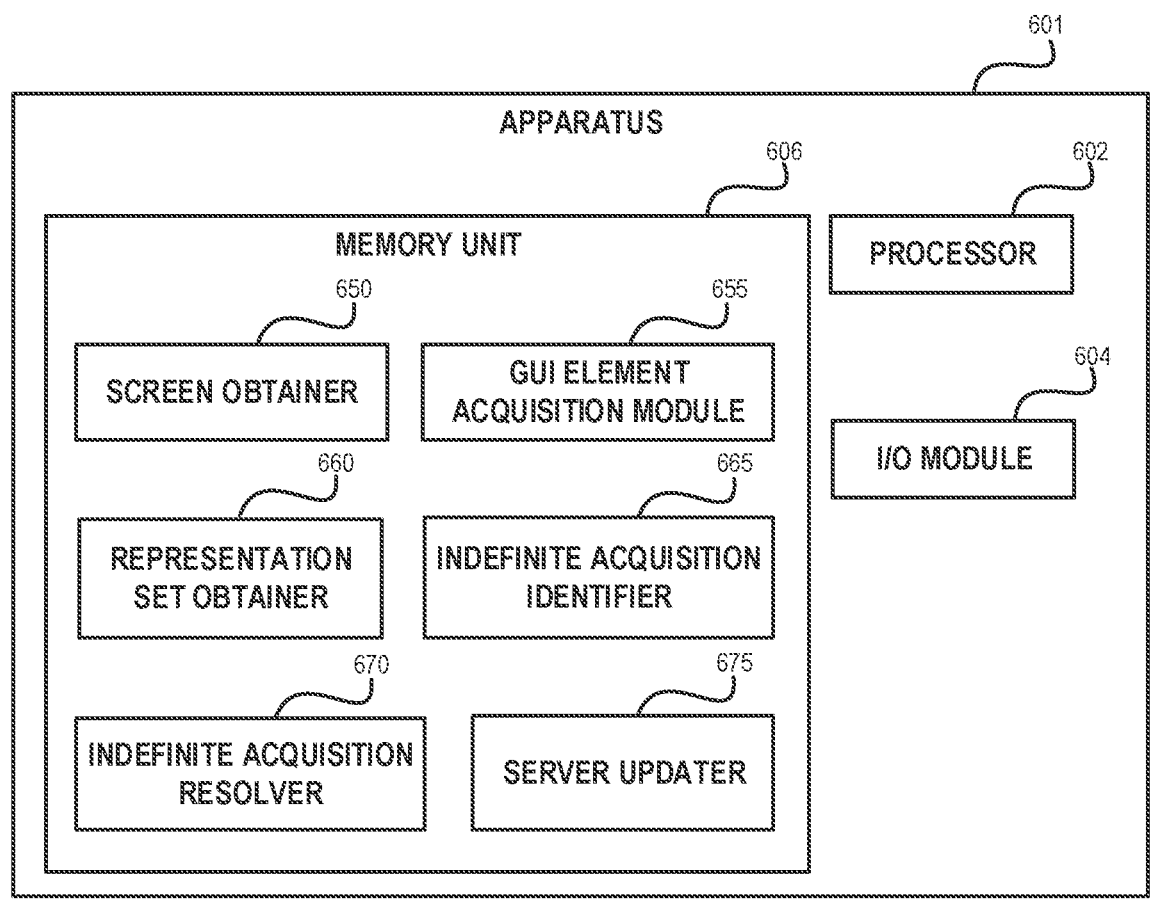
FIG. 6B shows a block diagram of an apparatus, in accordance with some exemplary embodiments of the disclosed subject matter.

Referring now to FIG. 6B, showing an apparatus in accordance with some exemplary embodiments of the disclosed subject matter. In some exemplary embodiments, Apparatus 601 may a client device, such as Client Device 110 of FIG. 1.

In some exemplary embodiments, Apparatus 600 may comprise one or more Processor(s) 602, an I/O Module 604, a Memory Unit 606, or the like.

In some exemplary embodiments, Processor 602 may be utilized to perform computations required by Apparatus 601 or any of it subcomponents.

I/O Module 604 may be utilized to communicate with other computerized devices, such as Server 120 of FIG. 1, Apparatus 600 of FIG. 6A, or the like, to receive a representation set, to notify the server of an indefinite result and provide the relevant information thereto, to provide usage information and success rates of each representation set, or the like.

Memory Unit 606 may be utilized to retain representation sets to be used for acquisition of GUI elements.

Memory Unit 606 may comprise Screen Obtainer 650. Screen Obtainer 650 may be configured to obtain a GUI of a program. As an example, a user (not shown) may use Apparatus 601 for her needs, such as for utilizing a web-based application, a mobile application or the like. In order to provide services such as walkthroughs, usage analysis, functionality augmentation, or the like, Screen Obtainer 650 may obtain the current screen in which the user is using. The screen may be obtained by capturing a digital representation of the GUI, such as obtaining an XML file representing the screen, obtaining an HTML file representing the screen, obtaining a layout file representing the screen, obtaining a playground object representing the screen, obtaining a DOM file, such as in JavaScript™-based GUIs, obtaining a screen-capture image of the screen, or the like.

Memory Unit 606 may comprise GUI Element Acquisition Module 655. GUI Element Acquisition Module 655 may be configured to acquire a GUI element. A GUI element may be acquired automatically, based on an application of a representation set on the GUI, obtained by Screen Obtainer 650. The acquired element may be reached, such as to allow access to properties thereof or modification of such properties, using a pointer, an identifier, a node in a DOM object, or the like. In some exemplary embodiments, GUI Element Acquisition Module 655 may trigger the execution of other components of Memory Unit 606 such as Representation Set Obtainer 660, Indefinite Acquisition Identifier 665, Indefinite Acquisition Resolver 670, or the like.

GUI Element Acquisition Module 655 may obtain a representation set provided by Representation Set Obtainer 660. Additionally or alternatively, after applying a representation set, GUI Element Acquisition Module 655 may be configured to invoke Indefinite Acquisition Identifier 665 in order to determine whether said applying the representation set provided an indefinite result.

Memory Unit 606 may comprise Representation Set Obtainer 660. Representation Set Obtainer 660 may be configured to obtain representation sets, such as from a server. In some exemplary embodiments, Representation Set Obtainer 660 may receive the representation set based on a broadcast of the server, by sending a query to the server in a pull communication model, or the like. Representation Set Obtainer 660 may obtain the representation set in advance and store the representation set in Memory Unit 606. Additionally or alternatively, Representation Set Obtainer 660 may be obtained the representation set on demand, when a process that requires acquisition of a GUI element is made available. In some exemplary embodiments, Representation Set Obtainer 660 may obtain a plurality of representation sets, each of which useful for acquiring a different GUI element.

Memory Unit 606 may comprise Indefinite Acquisition Identifier 665. Indefinite Acquisition Identifier 665 may be configured to identify an indefinite result when attempting to acquire a GUI element. In some exemplary embodiments, in response to GUI Element Acquisition Module 655 applying the representation set, Indefinite Acquisition Identifier 665 may determine whether the outcome is an indefinite result or a definite result. Indefinite Acquisition Identifier 665 may identify an indefinite result in case that an alternative representation comprising the representation set provided more than one result. Additionally or alternatively, Indefinite Acquisition Identifier 665 may identify an indefinite result in case that two different alternative representations comprised by the representation set provided different results, such as identified two or more different elements as the element to be acquired, or identified one element to be acquired on the one hand and no element to be acquired on the other hand.

Memory Unit 606 may comprise Indefinite Acquisition Resolver 670. Indefinite Acquisition Resolver 670 may be configured to resolve indefinite result of a GUI element for the purpose of acquiring an element albeit the indefinite result. In some exemplary embodiments, Indefinite Acquisition Resolver 670 may be configured to select a GUI element from a set of potential candidates that were identified by the application of the representation set on the GUI. In some exemplary embodiments, a majority vote or other quorum decision may be made to select between the potential candidates. Additionally or alternatively, a score may be associated with each candidate, allowing to use a weighted majority decision. In some exemplary embodiments, the score of the candidate may be based on a confidence level associated with the alternative representation that provided the candidate, the number of alternative representations that provided the candidate, success rate of application of the alternative representation on other GUIs, or the like. In some exemplary embodiments, Indefinite Acquisition Resolver 670 may apply a machine learning model to select the correct candidate out of the potential candidates provided by the application of the representation set. In some exemplary embodiments, the machine learning model may be provided by Representation Learner 650 of FIG. 6A. In some exemplary embodiments, the predictive model determined by Representation Learner 650 of FIG. 6A may be provided to Apparatus 601 and applied so as to resolve indefinite results automatically.

Memory Unit 606 may comprise Server Updater 675. Server Updater 675 may be configured to send updates to a server such as Server 120 of FIG. 1, Apparatus 600 of FIG. 6a, or the like. In some exemplary embodiments, in response to an indefinite result of applying a representation set, Server Updater 675 may communicate the relevant information to the server, so as to invoke a modification of the representation set. In some exemplary embodiments, the information is obtained by Indefinite Results Obtainer 630 of FIG. 6A. Additionally or alternatively, additional information may be transmitted by Server Updater 675 to the server. For example, usage statistics of application of representation set may be transmitted. As another example, GUIs obtained by Screen Obtainer 650 may be transmitted to the server, and retained in a database, such as Historic Screens Database 660.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining multiple representations of a Graphical User Interface (GUI) element in a first page, wherein the multiple representations comprise alternative representations of the GUI element that enable to identify the GUI element in the first page, whereby acquisition of the GUI element in the first page is enabled using each alternative representation of the GUI element individually, wherein the multiple representations comprise first and second alternative representations of the GUI element, the first alternative representation different from the second alternative representation, wherein the first alternative representation comprises a first plurality of attributes of the GUI element in the first page, wherein the second alternative representation comprises a second plurality of attributes of the GUI element in the first page, wherein the first alternative representation of the GUI element utilizes a first combination of the first plurality of attributes to represent the GUI element, wherein the second alternative representation of the GUI element of utilizes a second combination of the second plurality of attributes to represent the GUI element, wherein the first alternative representation is sufficient for acquiring the GUI element in the first page, wherein the second alternative representation is sufficient for acquiring the GUI element in the first page;

applying the multiple representations of the GUI element over a second page in order to identify the GUI element in the second page, wherein said applying comprises separately applying each representation of the multiple representations over the second page, wherein said applying comprises separately applying the first and second alternative representations of the GUI element over the second page;

identifying the GUI element in the second page by determining that all of the multiple representations of the GUI element identify only one same element in the second page, wherein said identifying comprises identifying that applying the first alternative representation in the second page identifies only the one same element in the second page, and that applying the second alternative representation identifies only the one same element in the second page, thereby acquiring the GUI element over the first and second pages; and performing an operation on the second page based on the GUI element being acquired in the second page.

2. The method of claim 1, wherein the multiple representations comprise multiple respective queries that identify the GUI element in the second page by executing each of the multiple respective queries over the second page.

3. The method of claim 1, wherein the first and second pages comprise two versions of a webpage.

4. The method of claim 3, wherein the two versions of the webpage comprise an early version and a later version of the webpage.

5. The method of claim 3, wherein the two versions of the webpage comprise two versions of the webpage are provided in different languages.

6. The method of claim 1, wherein the first plurality of attributes of the first alternative representation of the GUI element comprise at least one of: an identifier of the GUI element, a text associated with the GUI element, a color of the GUI element, and a relative path to the GUI element, wherein the relative path to the GUI element is defined with respect to another GUI element in the first page.

7. The method of claim 1 further comprises:
determining the multiple representations by:
applying a first set of representations over multiple historic pages of the first page, wherein the multiple historic pages comprise different pages, wherein said applying comprises:
applying a first representation from the first set of representations over a page of the multiple historic pages, and
applying a second representation from the first set of representations over the page;
determining that said applying the first set of representations over the page results with an indefinite result, wherein the indefinite result comprises:
a first resulting GUI element in the page that is obtained based on the first representation, and
a second resulting GUI element that is obtained based on the second representation,
wherein the second resulting GUI element is different than the first resulting GUI element;
selecting the first resulting GUI element as corresponding to the GUI element; and
modifying the first set of representations to a modified set of representations, wherein the modified set of representations excludes the second representation, wherein applying the modified set of representations over the page yields a single resulting GUI element, wherein the modified set of representations comprises the multiple representations.

8. The method of claim 7, wherein said selecting the first resulting GUI element is based on a selection of a human.

9. The method of claim 7, wherein said obtaining the multiple representations of the GUI element comprises automatically performing said determining the multiple representations.

10. The method of claim 7, wherein said determining the multiple representations is performed at a server.

11. The method of claim 1, wherein the operation comprises performing a usage analysis of the GUI element over the first and second pages.

12. The method of claim 1, wherein the operation comprises generating a walkthrough over the second page.

13. The method of claim 1, wherein said applying, identifying, and performing is performed by a software agent that is executed at an end device.

14. The method of claim 1, wherein the multiple representations are obtained at an end device from a server.

15. The method of claim 1, wherein said applying and identifying are performed by a software agent coupled to a web browser, wherein the web browser being utilized to present the first and second pages.

16. The method of claim 1, wherein said applying and identifying are performed by a software agent coupled to a native mobile application, wherein the native mobile application being utilized to present the first and second pages.

17. The method of claim 1, wherein said applying comprises querying a Document Object Model (DOM) of the second page in order to identify the GUI element in the DOM of the second page.

18. An apparatus comprising a processor and a coupled memory, the processor being adapted to perform:
obtaining multiple representations of a Graphical User Interface (GUI) element in a first page, wherein the multiple representations comprise alternative representations of the GUI element that enable to identify the GUI element in the first page, whereby acquisition of the GUI element in the first page is enabled using each alternative representation of the GUI element individually, wherein the multiple representations comprise first and second alternative representations of the GUI element, the first alternative representation different from the second alternative representation, wherein the first alternative representation comprises a first plurality of attributes of the GUI element in the first page, wherein the second alternative representation comprises a second plurality of attributes of the GUI element in the first page, wherein the first alternative representation of the GUI element utilizes a first combination of the first plurality of attributes to represent the GUI element, wherein the second alternative representation of the GUI element utilizes a second combination of the second plurality of attributes to represent the GUT element, wherein the alternative representation is sufficient for acquiring the GUI element in the first page, wherein the second alternative on is sufficient for acquiring the GUI element in the first page;

applying the multiple representations of the GUI element over a second page in order to identify the GUI element in the second page, wherein said applying comprises separately applying each representation of the multiple representations over the second page, wherein said lying comprises separately applying the first and second alternative representations of the GUI element over the second page;

identifying the GUI element in the second page by determining that all of the multiple representations of the GUI element identify only one same element in the second page, wherein said identifying comprises identifying the applying the first alternative representation in the second page identifies only the one same element in the second page, and that applying the second alternative representation identifies only the one same element in the second page, thereby acquiring the GUI element over the first and second pages; and performing an operation on the second page based on the GUI element being acquired in the second page.

19. A system comprising the apparatus of claim 18, wherein the system comprising the processor, wherein the processor is configured to determine the multiple representations by:

applying a first set of representations over multiple historic pages, wherein the multiple historic pages comprise different pages, wherein said applying comprises applying a first representation from the first set of representations over a page of the multiple historic pages, and applying a second representation from the first set of representations over the page;

determining that said applying the first set of representations over the page results with an indefinite result, wherein the indefinite result comprises a first resulting GUI element in the page that is obtained based on the first representation, and a second resulting GUI element that is obtained based on the second representation, wherein the second resulting GUI element is different than the first resulting GUI element;

selecting the first resulting GUI element as corresponding to the GUI element; and modifying the first set of representations to a modified set of representations, wherein the modified set of representations excludes the second representation, wherein applying the modified set of representations over the page yields a single resulting GUI element, wherein the modified set of representations comprises the multiple representations.

20. The apparatus of claim 18, wherein the operation comprises at least one of:

performing a usage analysis of the GUI element over the first and second pages; and generating a walkthrough over the second page.

21. The apparatus of claim 18 comprising a software agent that is coupled to a web browser, wherein said applying and identifying are performed by the software agent, wherein the web browser being utilized to present the first and second pages.

22. The apparatus of claim 18 comprising a software agent that is coupled to a native mobile application, wherein said applying and identifying are performed by the software agent, wherein the native mobile application being utilized to present the first and second pages.

23. The apparatus of claim 18, wherein said applying comprises querying a Document Object Model (DOM) of the second page in order to identify the GUI element in the DOM of the second page.

24. A computer program product comprising a non-transitory computer readable storage medium retaining program instructions, which program instructions when read by a processor, cause the processor to perform:

obtaining multiple representations of a Graphical User Interface (GUI) element in a first page, wherein the multiple representations comprise alternative representations of the GUI element that enable to identify the GUI element in the first page, whereby acquisition of the GUI element in the first page is enabled using each alternative representation of the GUI element individually, wherein the multiple representations comprise first and second alternative representations of the GUI element, the first alternative representation different from the second alternative representation, wherein the first alternative representation comprises a first plurality of attributes of the GUI element in the first page, wherein the second alternative representation comprises a second plurality of attributes of the GUI element in the first page, wherein the first alternative representation of the GUI element utilizes a first combination of the first plurality of attributes to represent the GUI element, wherein the second alternative representation of the GUI element utilizes a second combination of the second alternative representation of the alternative representation is sufficient for acquiring GUI element in the first page;

applying the multiple representations of the GUI element over a second page in order to identify the GUI element in the second page, wherein said applying comprises separately applying each representation of the multiple representations over the second page, wherein said applying comprises separately applying the first and second alternative representations of the GUI element over the second page;

identifying the GUI element in the second page by determining that all of the multiple representations of the GUI element identify only one same element in the second page, wherein said identifying comprises identifying that applying the first alternative representation in the second page identifies only the one same element in second page, and that applying the second alternative representation identifies only the one same element in the second page, thereby acquiring the GUI element over the first and second pages; and performing an operation on the second page based on the GUI element being acquired in the second page.

25. The computer program product of claim 24, wherein the program instructions when read by the processor, cause the processor to determine the multiple representations by:

applying a first set of representations over multiple historic pages, wherein the multiple historic pages comprise different pages, wherein said applying comprises applying a first representation from the first set of representations over a page of the multiple historic pages, and applying a second representation from the first set of representations over the page;

determining that said applying the first set of representations over the page results with an indefinite result, wherein the indefinite result comprises a first resulting GUI element in the page that is obtained based on the first representation, and a second resulting GUI element that is obtained based on the second representation, wherein the second resulting GUI element is different than the first resulting GUI element;

selecting the first resulting GUI element as corresponding to the GUI element; and modifying the first set of representations to a modified set of representations, wherein the modified set of representations excludes the second representation, wherein applying the modified set of representations over the page yields a single resulting GUI element, wherein the modified set of representations comprises the multiple representations.

26. The computer program product of claim 24, wherein the operation comprises at least one of:
performing a usage analysis of the GUI element over the first and second pages; and
generating a walkthrough over the second page.

27. The computer program product of claim 24, wherein at least a portion of the program instructions are comprised by a software agent that is coupled to a web browser, wherein said applying and identifying are performed by the software agent, wherein the web browser being utilized to present the first and second pages.

28. The computer program product of claim 24, at least a portion of the program instructions are comprised by a software agent that is coupled to a native mobile application, wherein said applying and identifying are performed by the software agent, wherein the native mobile application being utilized to present the first and second pages.

29. The computer program product of claim 24, wherein said applying comprises querying a Document Object Model (DOM) of the second page in order to identify the GUI element in the DOM of the second page.

* * * * *